(12) United States Patent
Gallagher et al.

(10) Patent No.: US 8,036,417 B2
(45) Date of Patent: Oct. 11, 2011

(54) FINDING ORIENTATION AND DATE OF HARDCOPY MEDIUM

(75) Inventors: Andrew C. Gallagher, Fairport, NY (US); Louis J. Beato, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 791 days.

(21) Appl. No.: 12/136,836

(22) Filed: Jun. 11, 2008

(65) Prior Publication Data

US 2009/0310814 A1   Dec. 17, 2009

(51) Int. Cl.
*G06K 9/00* (2006.01)
*G06F 15/16* (2006.01)

(52) U.S. Cl. .................. 382/100; 382/305; 709/229

(58) Field of Classification Search .......... 382/100, 382/103, 106–107, 112–114, 155, 162, 168, 382/171, 173, 181, 189, 190, 232, 254, 274, 382/276, 287–297, 305, 312, 319, 321; 358/3.28; 707/102; 705/14.4; 715/202; 709/229
See application file for complete search history.

(56) References Cited

U.S. PATENT DOCUMENTS

| | | | |
|---|---|---|---|
| 4,870,694 A | 9/1989 | Takeo | |
| 5,642,443 A | 6/1997 | Goodwin et al. | |
| 6,011,585 A | 1/2000 | Anderson | |
| 6,512,846 B1 | 1/2003 | Luo | |
| 6,591,005 B1 | 7/2003 | Gallagher | |
| 6,623,528 B1 * | 9/2003 | Squilla et al. | 715/202 |
| 6,940,545 B1 | 9/2005 | Ray et al. | |
| 7,124,191 B2 * | 10/2006 | McIntyre | 709/229 |
| 7,191,146 B2 * | 3/2007 | Wulff et al. | 705/14.4 |
| 7,215,828 B2 * | 5/2007 | Luo | 382/289 |
| 7,855,810 B2 * | 12/2010 | Manico et al. | 358/3.28 |
| 2006/0198559 A1 | 9/2006 | Manico et al. | |
| 2007/0109389 A1 | 5/2007 | Slatter | |
| 2007/0250529 A1 * | 10/2007 | Beato et al. | 707/102 |

* cited by examiner

*Primary Examiner* — Seyed Azarian

(74) *Attorney, Agent, or Firm* — Raymond L. Owens

(57) ABSTRACT

A method of determining the image capture date of scanned hardcopy medium, includes scanning hardcopy medium that includes at least one index print(s) to produce scanned digital images; detecting one or more index prints from among the scanned digital images; identifying thumbnail images contained within the one or more index prints; determining an image capture date for each index print and associating the image capture date with the thumbnail image(s) contained within that index print; matching a scanned digital image to a thumbnail image from the one or more index prints; associating the date from the thumbnail image to the scanned digital image that matches the thumbnail image; and storing the date in association with the scanned digital image that matches the thumbnail image.

7 Claims, 15 Drawing Sheets

FINDING ORIENTATION AND DATE OF HARDCOPY MEDIUM

CROSS REFERENCE TO RELATED APPLICATIONS

Reference is made to commonly assigned U.S. patent application Ser. No. 11/511,798 file Apr. 21, 2006 (now U.S. Patent Application Publication No. 2007/0250529) entitled "Method for Automatically Generating a Dynamic Digital Metadata Record From Digitized Hardcopy Media by Louis J. Beato et al; U.S. patent application Ser. No. 12/136,820 filed concurrently herewith, entitled "Finding Image Capture Date of Hardcopy Medium" by Andrew C. Gallagher et al and U.S. patent application Ser. No. 12/136,815 filed concurrently herewith, entitled "Determining the Orientation of Scanned Hardcopy Medium" by Andrew C. Gallagher et al, the disclosures of which are incorporated herein.

FIELD OF THE INVENTION

The present invention relates to using index prints found in scanned medium to determine the date or orientation of other scanned medium.

BACKGROUND OF THE INVENTION

Consumers today are switching from film-based chemical photography to digital photography in increasing numbers. The instantaneous nature of image capture and review, the ease of use, numerous output and sharing options, multimedium capabilities, and on-line and digital medium storage capabilities have all contributed to consumer acceptance of this technological advancement. A hard drive, on-line account, or a DVD can store thousands of images, which are readily available for printing, transmitting, conversion to another format, conversion to another medium, or used to produce an image product. Since the popularity of digital photography is relatively new, the majority of images retained by a typical consumer usually takes the form of hardcopy medium. These legacy images can span decades of time and have a great deal of personal and emotional importance to the collection's owner. In fact, these images often increase in value to their owners over time. Thus, even images that were once not deemed good enough for display are now cherished. These images are often stored in boxes, albums, frames, or even their original photofinishing return envelopes.

Getting a large collection of legacy images into a digital form is often a formidable task for a typical consumer. The user is required to sort through hundreds of physical prints and place them in some relevant order, such as chronology or sorting by event. Typically, events are contained on the same roll of film or across several rolls of film processed in the same relative time frame. After sorting the prints, the user would be required to scan the medium to make a digital version of the image. Scanning hardcopy image medium such as photographic prints to obtain a digital record is well known. Many solutions currently exist to perform this function and are available at retail from imaging kiosks and digital minilabs and at home with "all-in-one" scanner/printers or with personal computers equipped with medium scanners. Some medium scanning devices include medium transport structure, simplifying the task of scanning hardcopy medium. Using any of these systems requires that the user spend time or expense converting the images into a digital form only to be left with the problem of providing some sort of organizational structure to the collection of digital files generated.

The prior art teaches sorting scanned hardcopy images by physical characteristics and also utilizing information/annotation from the front and back of the image. This teaching permits grouping images in a specific chronological sequence, which can be adequate for very large image collections. However, if the images are scanned and organized, but are not rotated correctly, they will be recorded to CD/DVD or some other suitable storage medium in the wrong orientation. This results in a less than ideal experience for the end user.

Accordingly, if additional metadata can be acquired from an image, there are several improvements to the image that can be made. For example, in addition to organization, metadata indicating that an image is black-and-white vs. color can be used to correct the orientation of the image.

Knowledge of image orientation permits the correct orientation of an image on an output display. Several algorithms exist for determining the orientation of images.

U.S. Pat. No. 5,642,443, to Goodwin et al., describes a method of considering an entire set of images in a consumer's film order to determine the orientation of an entire order. A statistical estimate of orientation is generated for each image in the set. A statistical estimate for the entire order is derived based upon the estimates for individual images in the set. Goodwin et al teach deriving relevant probabilities from spatial distributions of colors within the image. Goodwin et al must view an entire order of images rather than a single image. There are applications that only contain one image that Goodwin et al will be unable to correctly orient.

Also, U.S. Pat. No. 4,870,694, to Takeo describes a method of determining the orientation of an image that contains a representation of a human body. The position of the human is used as a clue to the orientation of the image. Takeo is primarily applicable to radiographic applications as used in hospitals or medical clinics. It is unlikely a broad-based consumer application, because it depends on certain constraints, such as requiring a human figure within the image.

Additionally, U.S. Pat. No. 6,011,585, Anderson, describes a method of determining image format and orientation based upon a sensor present in the camera at the time of image capture. However, if a sensor is not present in a particular camera or image-capturing device, the method of Anderson is not useful. The approach described by Anderson has the further disadvantage of requiring additional apparatus in the camera. Moreover, an image processing unit or operation will be unable to perform correct orientation unless the particular camera contained the additional apparatus. Likewise, this method is not able to find the orientation of a scanned photographic print because the state of the camera's sensor is not recorded on the photographic print.

Several other methods for determining the orientation of an image have been described where either low-level features (as described in U.S. Pat. No. 7,215,828) are extracted or objects are detected and used to determine the orientation of the image. For example, it is known to determine orientation of images based on looking for faces as discloses in U.S. Pat. No. 6,940,545 to Ray et al., but only about 75% of images contain faces and automatic face detectors sometimes miss detecting faces even when they are present, or find false faces that are not actually in an image. Other methods of determining image orientation are based on finding sky (see U.S. Pat. No. 6,512,846) or grass or street signs (as described in U.S. Pat. No. 7,215,828), but again many images do not contain these materials. Furthermore, the structure of lines and vanishing points in the image has been shown to be useful for determining the format and orientation of images (U.S. Pat. No. 6,591,005). Even considering all of these features, there are still many images that will not be oriented properly because they do not contain the sought after objects, or the object detectors were incorrect. Further complicating the problem of determining the orientation of scanned photographic prints is the fact that many prints contain no color information, which complicates and compromises the accuracy of the detection of sky and other materials.

In addition to the problem or properly orienting the images, for organizing and searching the image collection that contains scanned images, it is useful to know the image capture date of the images.

SUMMARY OF THE INVENTION

It is an object of the present invention to provide an improved method for accurately estimating the image orientation or image capture date of a scanned hardcopy medium. This object is achieved by a method of determining the image capture date of scanned hardcopy medium, comprising:

(a) scanning hardcopy medium that includes at least one index print(s) to produce scanned digital images;

(b) detecting one or more index prints from among the scanned digital images;

(c) identifying thumbnail images contained within the one or more index prints;

(d) determining an image capture date for each index print and associating the image capture date with the thumbnail image(s) contained within that index print;

(e) matching a scanned digital image to a thumbnail image from the one or more index prints;

(f) associating the date from the thumbnail image to the scanned digital image that matches the thumbnail image; and (g) storing the date in association with the scanned digital image that matches the thumbnail image.

BRIEF DESCRIPTION OF THE DRAWINGS

The invention can be more completely understood by considering the detailed description of various embodiments of the invention which follows in connection with the accompanying drawings. Referring now to the drawings in which like reference numbers represent corresponding parts throughout.

DETAILED DESCRIPTION OF THE INVENTION

Figure 1:
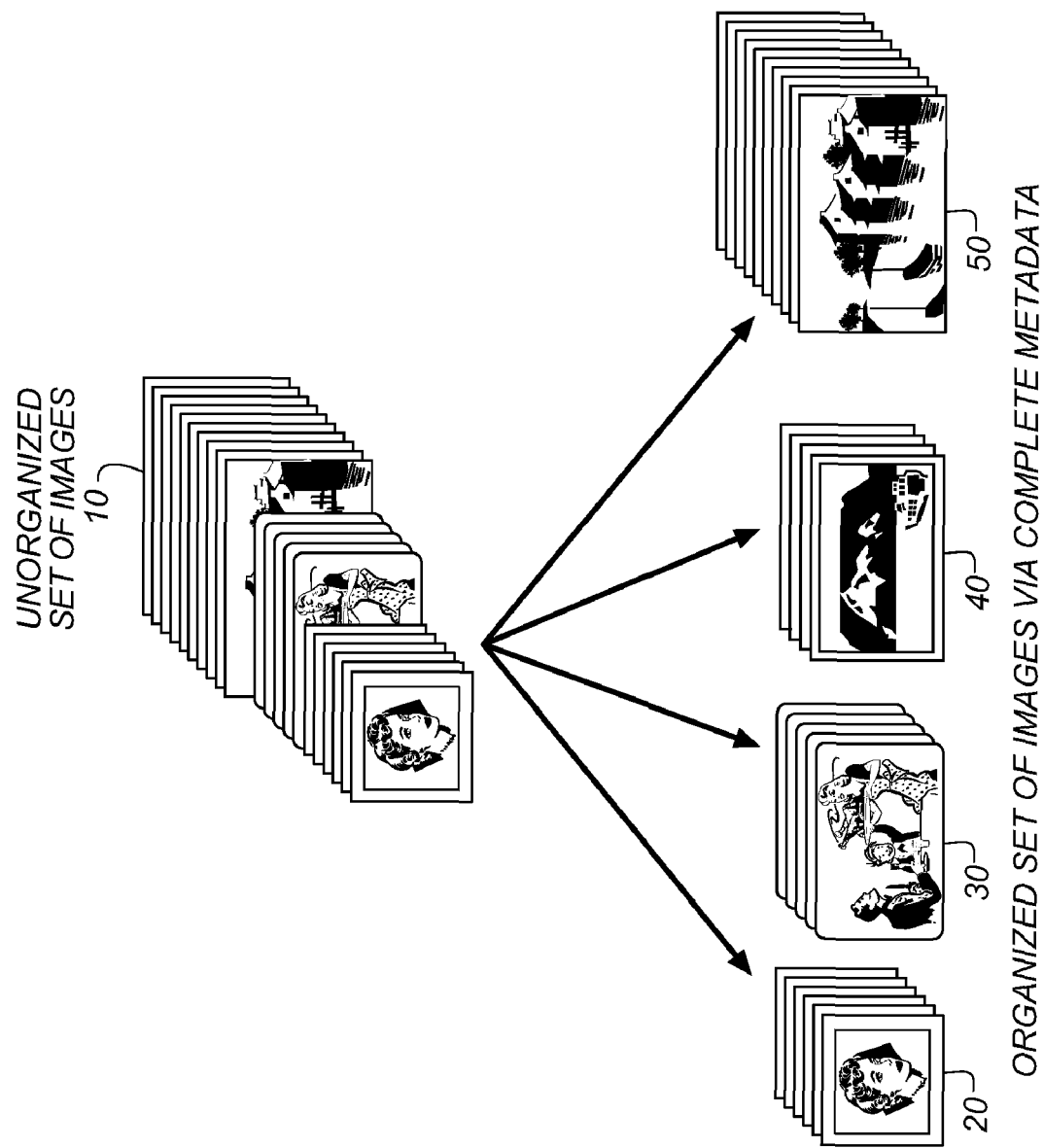
FIG. 1 illustrates a system that sorts hardcopy medium images using the physical characteristics obtained from the image bearing hardcopy medium.

FIG. 1 illustrates one technique to sort hardcopy medium images using the physical characteristics obtained from the image bearing hardcopy medium. Hardcopy medium collections include, for example, optically and digitally exposed photographic prints, thermal prints, electro-photographic prints, inkjet prints, slides, film motion captures, and negatives. These hardcopy medium often correspond with images captured with image capture devices such as cameras, sensors, or scanners. Over time, hardcopy medium collections grow and medium of various forms and formats are added to various consumer selected storage techniques such as boxes, albums, file cabinets, and the like. Some users keep the photographic prints, index prints, and film negatives from individual rolls of film in their original photofinishing print return envelopes. Other users remove the prints and they become separated from index prints and film negatives and become combined with prints from other rolls.

Over time, these collections become large and unwieldy. Users typically store these collections in boxes and it is difficult to find and gather images from certain events or time eras. It can require a significant time investment for the user to locate their images given the sorting requirement they can have at that time. For example, if you were looking for all images of your children, it would be extremely difficult to manually search your collection and look at each image to determine if it includes your child. If you are looking for images from the 1970s, you would have a very difficult process once again to look at the image (either the front or the back) to find the year it was taken.

These unorganized collections of hardcopy medium 10 also includes of print medium of various sizes and formats.

This unorganized hardcopy medium 10 can be converted to digital form with a medium scanner capable of duplex scanning (not shown). If the hardcopy medium 10 is provided in a "loose form," such as with prints in a shoebox, it is preferable to use a scanner with an automatic print feed and drive system. If the hardcopy medium 10 is provided in albums or in frames, a page scanner or digital copy stand should be used so as not to disturb or potentially damage the hardcopy medium 10.

Once digitized, the resulting digitized images are separated into designated subgroups 20, 30, 40, 50 based on physical size and format determined from the image data recorded by the scanner. Existing medium scanners, such as the KODAK i600 Series Document Scanners, automatically transport and duplex scan hardcopy medium, and include image-processing software to provide automatic de-skewing, cropping, correction, text detection, and Optical Character Recognition (OCR). The first subgroup 20 represents images of bordered 3.5"×3.5" (8.89 cm×8.89 cm) prints. The second subgroup 30 represents images of borderless 3.5"×5" (8.89 cm×12.7 cm) prints with round corners. The third subgroup 40 represents images of bordered 3.5"×5" (8.89 cm×12.7 cm) prints. The fourth subgroup 50 represents images of borderless 4"×6" (10.16 cm×15.24 cm) prints. Even with this new organizational structure, any customer provided grouping or sequence of images is maintained as a sort criterion. Each group, whether envelope, pile or box, should be scanned and tagged as a member of "as received" group and sequence within the group should be recorded.

Figure 2:
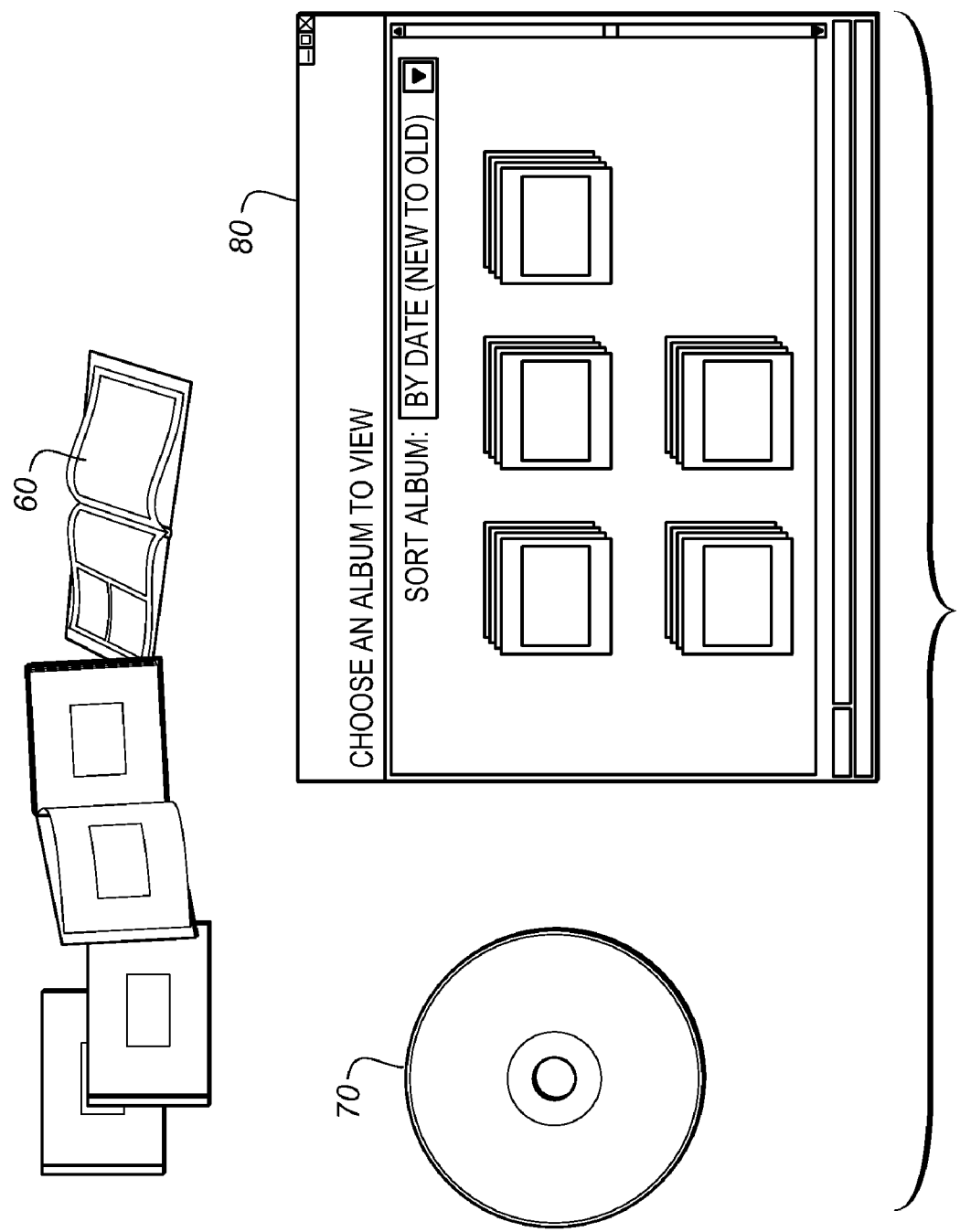
FIG. 2 illustrates other types of hardcopy medium collections such as photo books, archive CDs and online photo albums.

FIG. 2 illustrates other types of hardcopy medium collections such as photo books, archive CDs and online photo albums. A picture book 60 contains hardcopy medium printed using various layouts selected by the user. The layouts can be by date, or event. Another type of hardcopy medium collection is the Picture CD 70 having images stored on the CD in various formats. These images could be sorted by date, event, or any other criteria that the user can apply. Another type of hardcopy medium collection is an online gallery of images 80, which is typically stored in an online (Internet based) or offline (local storage). All of the collections in FIG. 2 are similar, but the storage mechanism is different. For example, the picture book 60 includes a printed page(s), the Picture CD 70 stored information on a CD, and the online gallery of images 80 is stored in magnetic storage.

Figure 3:
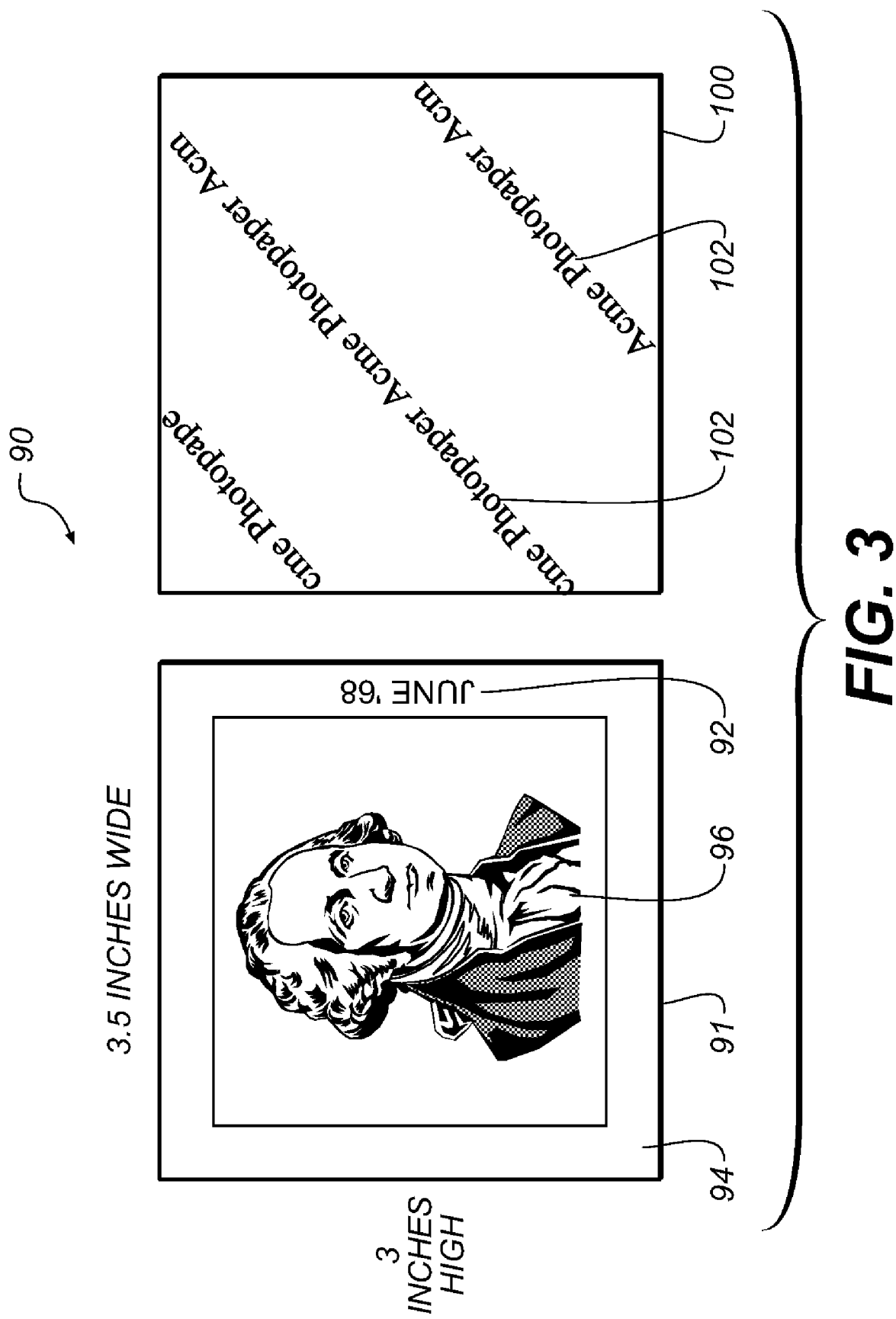
FIG. 3 is an illustration of an image and a non-image surface of a hardcopy medium image including an ink printed photofinishing process applied stamp including the date of image processing.

FIG. 3 illustrates an example of a hardcopy imaging medium that includes both the image and non-image surfaces. Photographic print medium 90 contains information that can be instantly recorded (e.g., size, or aspect ratio) and information that can be derived (e.g. black-white versus color, or border). Together this information can be gathered as metadata for the print medium 90 and stored along with the print medium 90. This metadata contains intrinsic information about the print medium 90 that can be formed into a type of organizational structure, such as a dynamic digital metadata record, to be used by the user to locate a specific event, time era, or group of prints that meet some criteria. For example, a user may want to collect all of the users' prints from the 1960s and 1970s so as to apply a dye fade reversal process to restore the prints. The user may want all pictures of your wedding or some other special occasion. If the prints contain this metadata in a digital form, the information can be used for these purposes.

This dynamic digital metadata record is an organizational structure that becomes even more important as image collections grow in size and time frame. If the hardcopy image collection is large, including thousands of images, and is converted to digital form, an organizational structure such as a file structure, searchable database, or navigational interface is required in order to establish usefulness.

Photographic print medium 90 and the like have an image surface 91, a non-image surface 100, and often include a manufacturer's watermark 102 on the non-imaging surface 100 of the print medium 90. The manufacturer of the print medium 90 prints watermarks 102 on "master rolls" of medium, which are slit or cut into smaller rolls suitable for use in photo processing equipment such as kiosks, minilabs, and digital printers. Manufacturers change watermarks 102 from time to time as new medium types with new characteristics, features and brand designations are introduced to the market. Watermarks 102 are used for promotional activities such as advertising manufacturer sponsorships, to designate special photofinishing processes and services, and to incorporate market specific characteristics such as foreign language translations for sale in foreign markets. Watermarks 102 are typically non-photographically printed on the non-image surface 100 of the print medium 90 with a subdued density and can include text of various fonts, graphics, logos, color variations, multiple colors, and typically run diagonally to the medium roll and cut print shape.

Manufacturers also include slight variations to the master roll watermarks such as adding a line above or below a designated character in the case of an alphanumeric watermark. This coding technique is not obvious or even apparent to user, but is used by the manufacturer in order to monitor manufacturing process control or to identify the location of a manufacturing process problem if a defect is detected. Different variations are printed at set locations across the master medium roll. When finished rolls are cut from the master roll they retain the specific coded watermark variant applied at that relative position along the master roll. In addition, manufacturers maintain records of the various watermark styles, coding methodologies, and when specific watermark styles were introduced into the market.

In testing with actual consumer hardcopy medium, it has been determined that watermark variations, including manufacturer watermarks with special process control coding, provided a very effective way to determine original film roll printing groupings. Once hardcopy medium images are separated into original roll printing groups, image analysis techniques can be used to further separate the roll groupings into individual events. Watermark analysis can also be used to determine printing sequence, printing image orientation, and the time frame in which the print was generated.

A typical photofinishing order, such as processing and printing a roll of film, will, under most circumstances, be printed on medium from the same finished medium roll. If a medium roll contains a watermark with a manufacturer's variant code and is used to print a roll of film negatives, the resulting prints will have a watermark that will most likely be unique within a user's hardcopy medium collection. An exception to this can be if a user had several rolls of film printed at the same time by the same photofinisher, as with film processed at the end of an extended vacation or significant event. However, even if the photofinisher had to begin a new roll of print paper during printing a particular customer's order, it is likely that the new roll will be from the same batch as the first. Even if that is not the case, the grouping of the event such as a vacation into two groups on the basis of differing back prints is not catastrophic.

The medium manufacturer, on an ongoing basis, releases new medium types with unique watermarks 102 to the market. Digital image scanning systems (not shown) can convert these watermarks 102 into digital records, which can be analyzed using Optical Character Recognition (OCR) or digital pattern matching techniques. This analysis is directed at identifying the watermark 102 so that the digital record can be compared to the contents of Look Up Tables (LUT's) provided by a manufacturer of the medium. Once identified, the scanned watermark 102 can be used to provide a date of manufacture or sale of the print medium. This date can be stored in the dynamic digital metadata record. The image obtained from the image surface 91 of the hardcopy medium 90 is sometimes provided with a date designation 92 such as the markings from a camera date back, which can be used to establish a time frame for a scanned hardcopy medium image 96 without intervention from the user.

If the hardcopy medium 90 has an unrecognized watermark style, that watermark pattern is recorded and stored as metadata in the dynamic digital metadata record and later used for sorting purposes. If a photofinisher or user applied date or other information indicative of an event, time frame, location, subject identification, or the like is detected, that information would be incorporated into the LUT and used to establish a chronology or other organizational structure for subsequent images including the previously unidentified watermark. If a user or photofinisher applied date is observed on that hardcopy medium 90, that date can be added to the LUT. The automatically updated LUT can now use this new associated date whenever this unknown watermark style is encountered. This technique can be deployed to establish a relative chronology for hardcopy image collections that can span decades.

Another technique uses the physical format characteristics of hardcopy medium 90 and correlates these to the film systems that were used to create them and the time frames that these film systems were in general use. Examples of these formats and related characteristics include the INSTAMATIC (a trademark of the Eastman Kodak Company) Camera and 126 film cartridge introduced in 1963 which produced 3.5 inch×3.5 inch (8.89 cm×8.89 cm) prints and was available in roll sizes of 12, 20, and 24 frames.

The Kodak Instamatic camera 110 film cartridge was introduced in 1972 and produced 3.5"×5" (8.89 cm×12.7 cm) prints and was available in roll sizes: 12, 20, and, 24 frames. The Kodak Disc camera and Kodak Disc film cartridge was introduced in 1982 and produced 3.5"×4.5" (8.89 cm×11.43 cm) prints with 15 images per Disc. Kodak, Fuji, Canon, Minolta and Nikon introduced the Advanced Photo System (APS) in 1996. The camera and film system had the capability for user selectable multiple formats including Classic, HDTV, and Pan producing prints sizes of 4"×6", 4"×7", and 4"×11" (10.16 cm×15.24 cm, 10.16×17.78 cm, 10.16×27.94 cm). Film roll sizes were available in 15, 25, and 40 frames and index prints containing imagettes of all images recorded on the film were a standard feature of the system.

The APS system has a date exchange system permitting the manufacturer, camera, and photofinishing system to record information on a clear magnetic layer coated on the film. An example of this data exchange was that the camera could record the time of exposure and the user selected format on the film's magnetic layer which was read and used by the photofinishing system to produce the print in the desired format and record the time of exposure, frame number, and film roll ID# on the back of the print and on the front surface of a digitally printed index print. 35 mm photography has been available in various forms since the 1920's to present and has maintained popularity until the present in the form of "One Time Use Cameras." 35 mm systems typically produce 3.5" (8.89 cm)×5" (12.7 cm) or 4" (10.16 cm)×6" (15.24 cm). Prints and roll sizes are available in 12, 24 and 36 frame sizes. "One Time Use Cameras" has the unique characteristic in that the film is "reverse wound" meaning that the film is wound back into the film cassette as pictures are taken producing a print sequence opposite to the normal sequence. Characteristics such as physical format, expected frame count, and imaging system time frame can all be used to organize scanning hardcopy medium into meaningful events, time frames, and sequences.

As with traditional photography instant photography systems also changed over time, for example, the Instant film SX-70 format was introduced in the 1970s, the Spectra system, Captiva, I-Zone systems were introduced in the 1990s, each of which had a unique print size, shape, and border configuration.

For cameras with a square format, the photographer had little incentive to rotate the camera. However, for image capture devices that produce rectangular hardcopy prints, the photographer sometimes rotates the image capture device by 90 degrees about the optical axis to capture a portrait format image (i.e. the image to be captured has a height greater than its width to capture objects such a buildings that are taller than they are wide) rather than a landscape format image (i.e. the image to be captured has a width greater than it's height).

In FIG. 3, some of the above mentioned characteristics are shown. Image surface 91 of the hardcopy imaging medium 90 is illustrated. The image surface 91 indicates the date designation 92 printed in a border 94. Centered on the image surface 91 is actual image data 96 of the hardcopy medium 90. In one embodiment, the non-image surface 100 includes a common configuration representing a watermark 102. In this embodiment, lines of evenly spaced text or graphics run diagonally across the back surface of hardcopy imaging medium, representing the watermark 102. In the embodiment, the watermark 102 includes a repeating text "Acme Photopaper."

Figure 4:
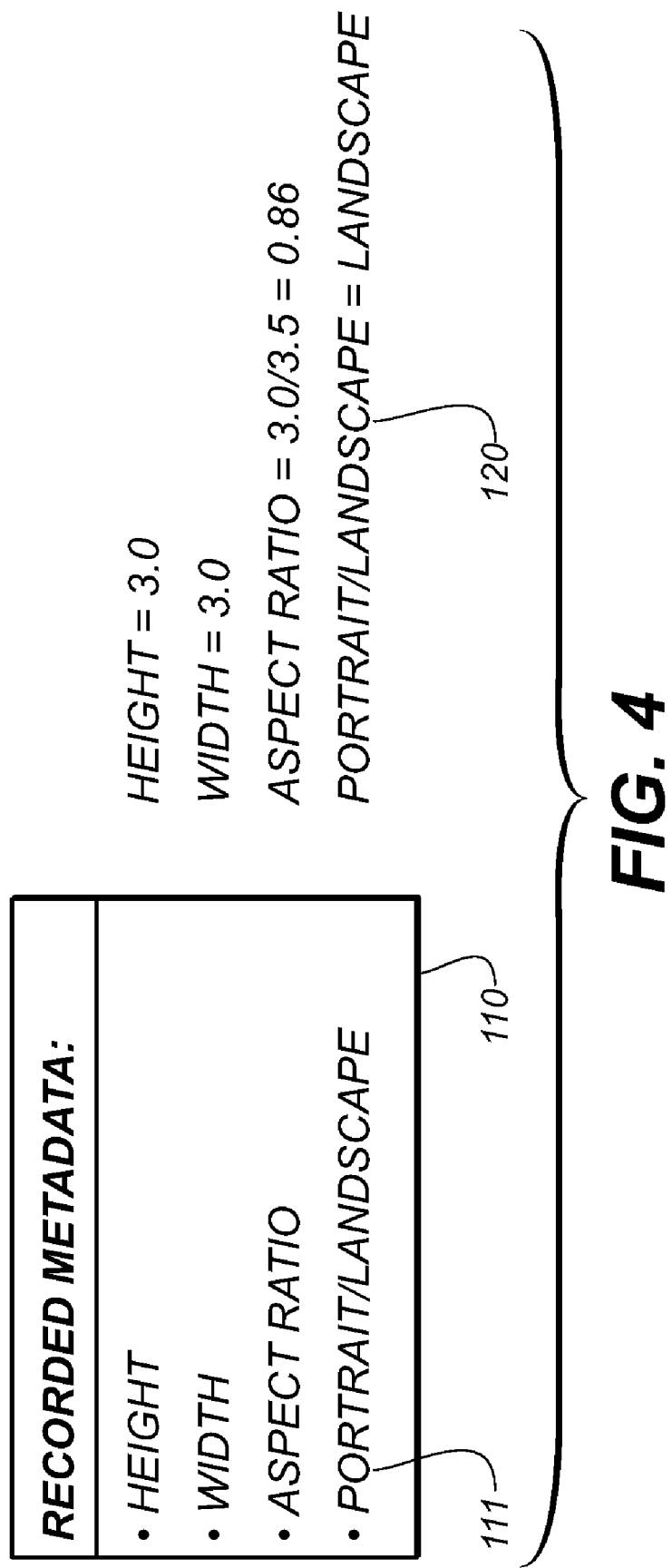
FIG. 4 is an illustration of recorded metadata dynamically extracted from the surfaces of a hardcopy medium image.

FIG. 4 illustrates recorded metadata 110 that is dynamically extracted from the hardcopy medium 90. The height, width, aspect ratio, and the orientation (portrait/landscape) for the hardcopy medium 90 can be extracted and recorded quickly and dynamically from the image and non-image surfaces of the hardcopy medium 90 without any derived calculations. The number of fields 111 correlating to the recorded metadata 110 can vary depending on, but not limited to, the characteristics of the hard copy medium 90, such as format, time period, photofinish, manufacturer, watermark, shape, size and other distinctive markings of the hardcopy medium 90. Accordingly, the recorded metadata 110 is dynamically acquired and subsequently stored in a dynamic digital metadata record. Sample values 120 for the recorded metadata fields 111 are shown adjacent to the recorded metadata 110.

Figure 5:
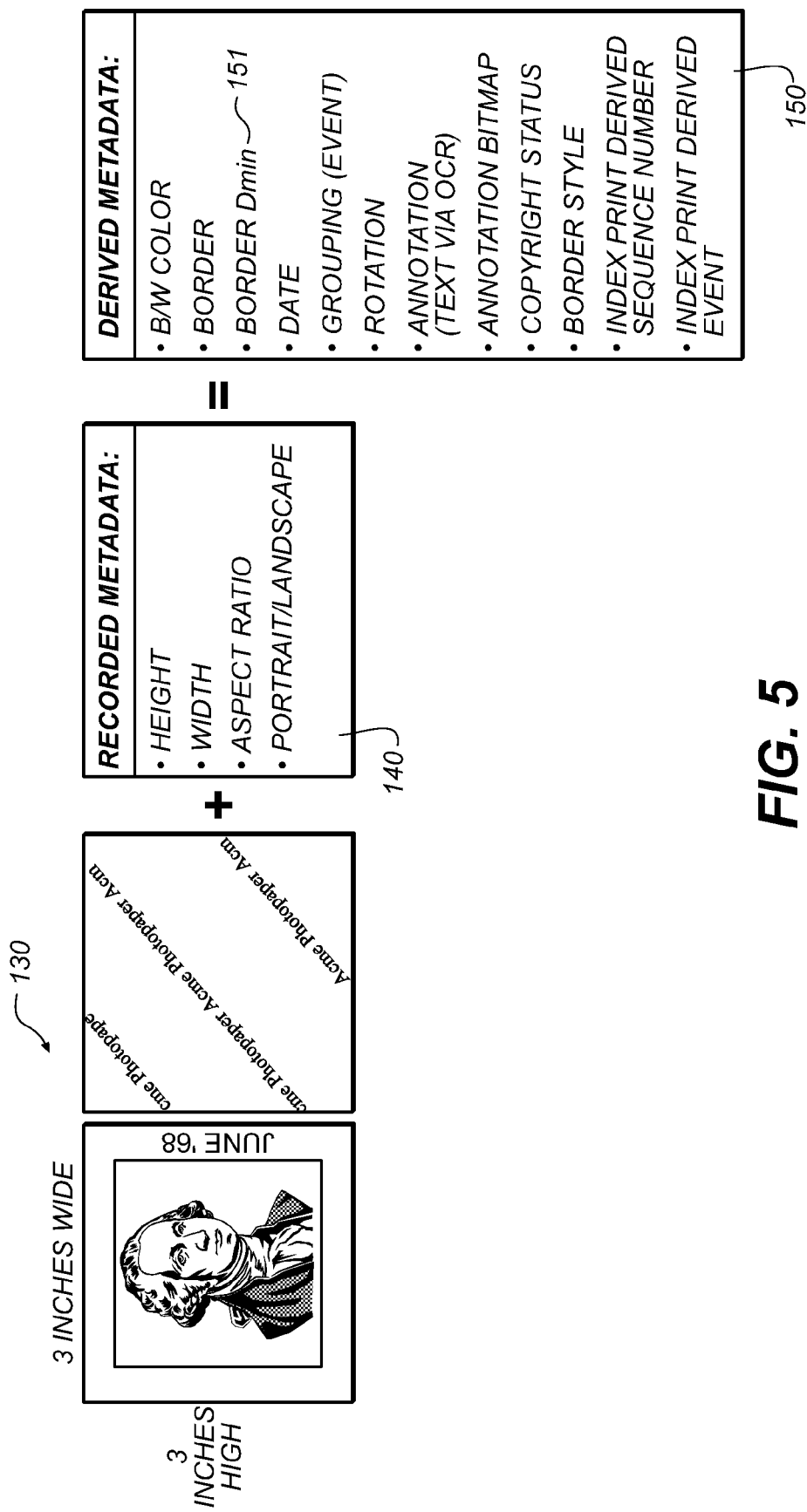
FIG. 5 is an illustration of metadata dynamically derived from the combination of image and non-image surfaces and recorded metadata of a hardcopy medium.

FIG. 5 is an illustration of metadata 150 dynamically derived from the combination of image and non-image surfaces and recorded metadata 140 of a hardcopy medium 130. The image and non-image surface of hardcopy medium 130 is analyzed using various methods and the resulting data is combined with the dynamically recorded metadata 140 to produce dynamically derived metadata 150. The derived metadata 150 requires several analysis algorithms to determine values for metadata fields 151 forming the dynamically derived metadata 150. The analysis algorithms include, but are not limited to, border detectors, black and white color detectors and orientation detectors. The number of metadata fields 151 correlating to the derived metadata 150 can vary depending on, but not limited to, the results of the algorithms, characteristics of the hard copy medium, as well as any additional information supplied by human or mechanical techniques as will be discussed in the following paragraphs. Accordingly, the derived metadata 150 is dynamically acquired and subsequently stored in a dynamic digital metadata record.

Figure 6:
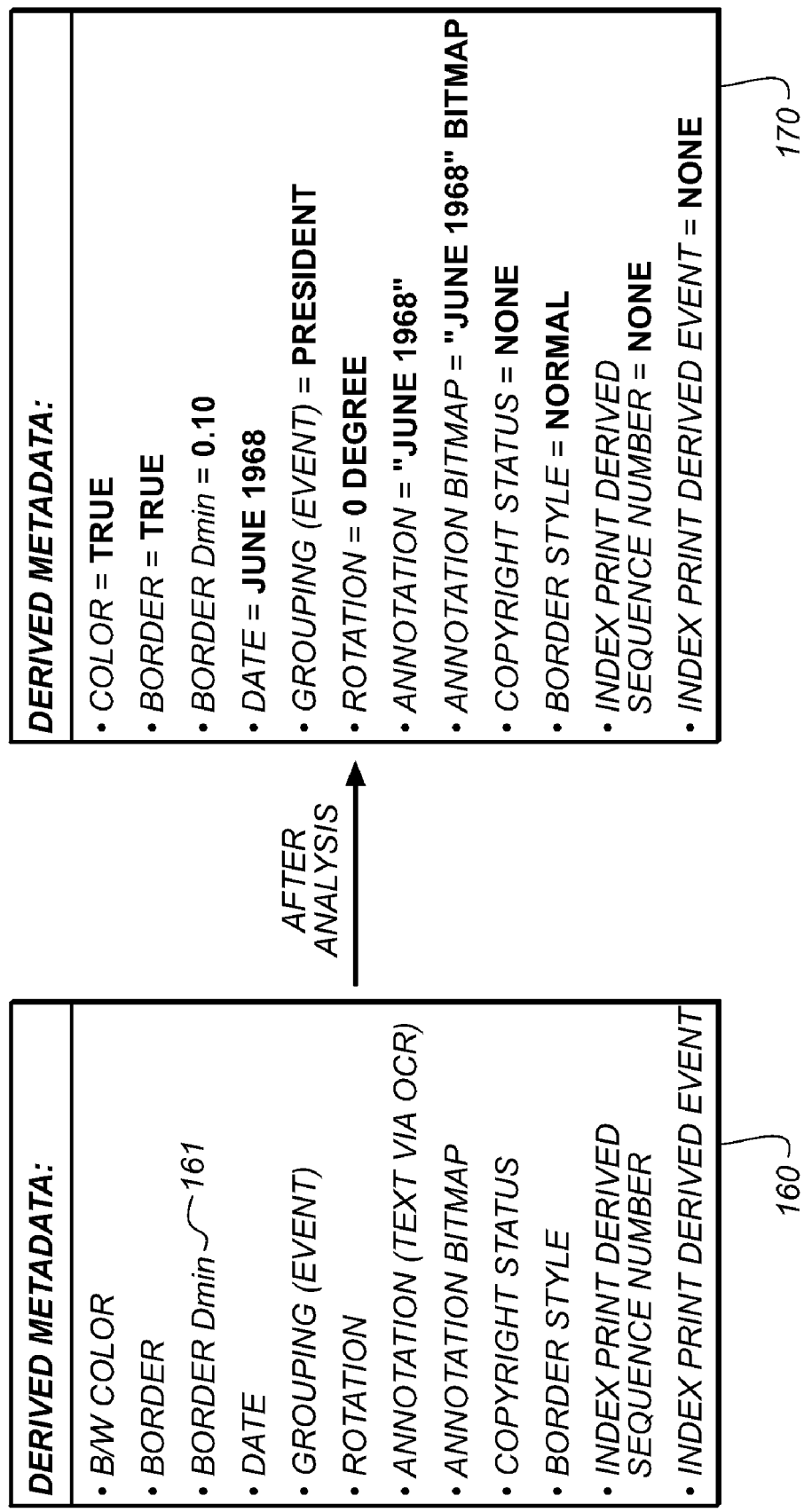
FIG. 6 is an illustration of sample values for dynamically derived metadata.

FIG. 6 is an illustration of sample values 170 for dynamically derived metadata 160. The derived metadata 160 includes sample values 161 for the color, border, border density, date, grouping, rotation, annotation, annotation bitmap, copyright status, border style, index print derived sequence, or index print derived event. However, the derived metadata 160 is not limited to these fields and any suitable fields can be dynamically created depending on at least the results of the algorithms, characteristics of the hard copy medium, as well as any additional information supplied by human or mechanical techniques, such as specific time era, subsequent pertinent information related to an event, correlated events, personal data, camera speeds, temperature, weather conditions, or geographical location.

Figure 7:
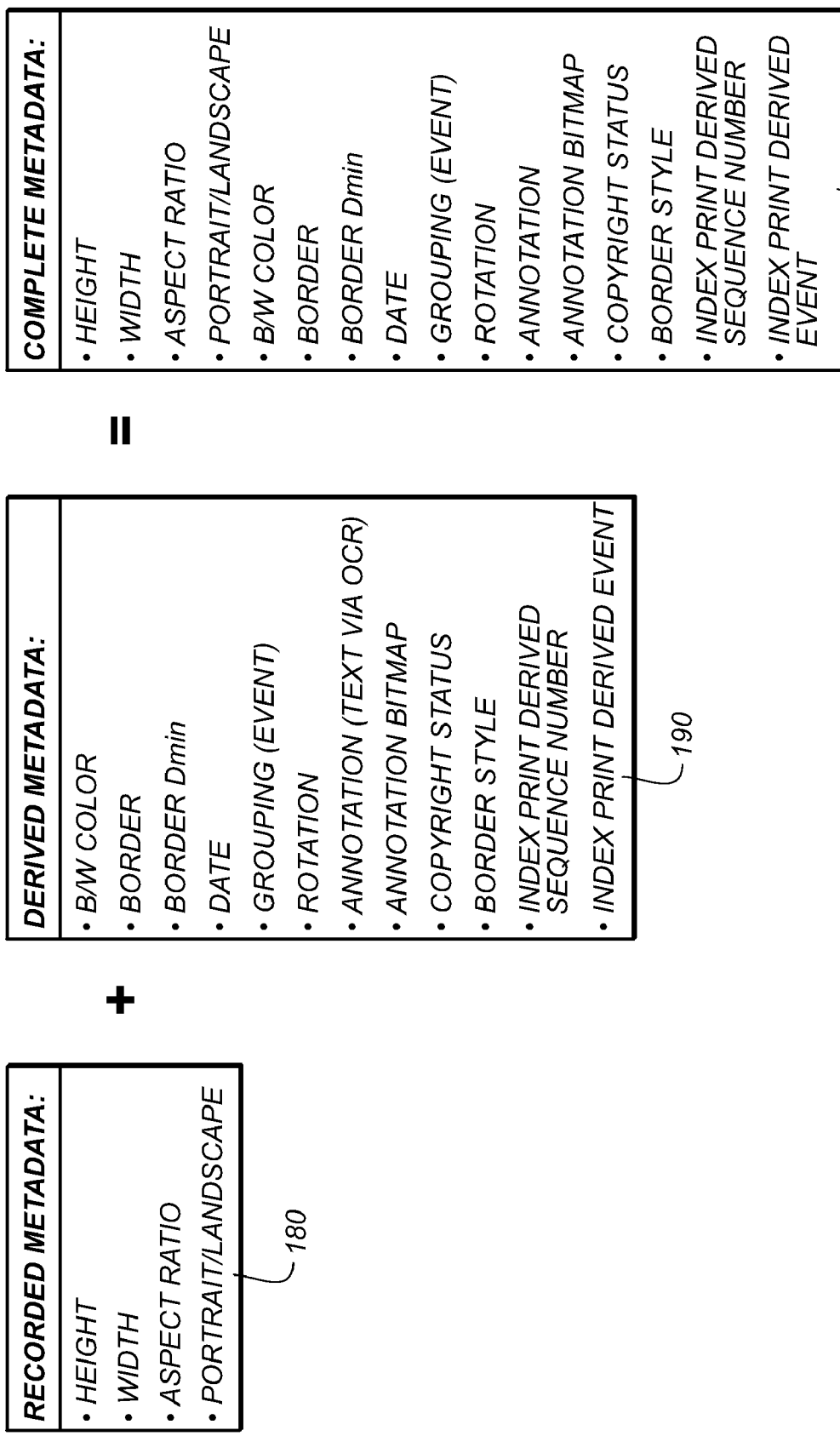
FIG. 7 is an illustration of the combination of the recorded metadata and the derived metadata that results in the complete metadata representation.

FIG. 7 is an illustration of the combination of dynamically recorded metadata 180 and dynamically derived metadata 190. This combination produces a complete metadata record, also referred to as dynamic digital metadata record 200, for the hardcopy medium. The complete metadata record 200, referred to as the dynamic digital metadata record, contains all information about a digitized hard copy medium. One or more complete metadata records 200 can be queried to at least group and correlate associated images given different search criteria.

For example, once every hardcopy medium item has been scanned and an associated complete metadata record 200 has been created, powerful search queries can be constructed to permit the hardcopy medium to be organized in different and creative ways. Accordingly, large volumes of hardcopy medium images can be rapidly converted into digital form and the digital metadata record 200 is dynamically created to completely represent the metadata of the image. This dynamic digital metadata record 200 can then be used for, but not limited to, manipulating the digitized hardcopy images, such as organizing, orientating, restoring, archiving, presenting and enhancing digitized hardcopy images.

Figure 8A:
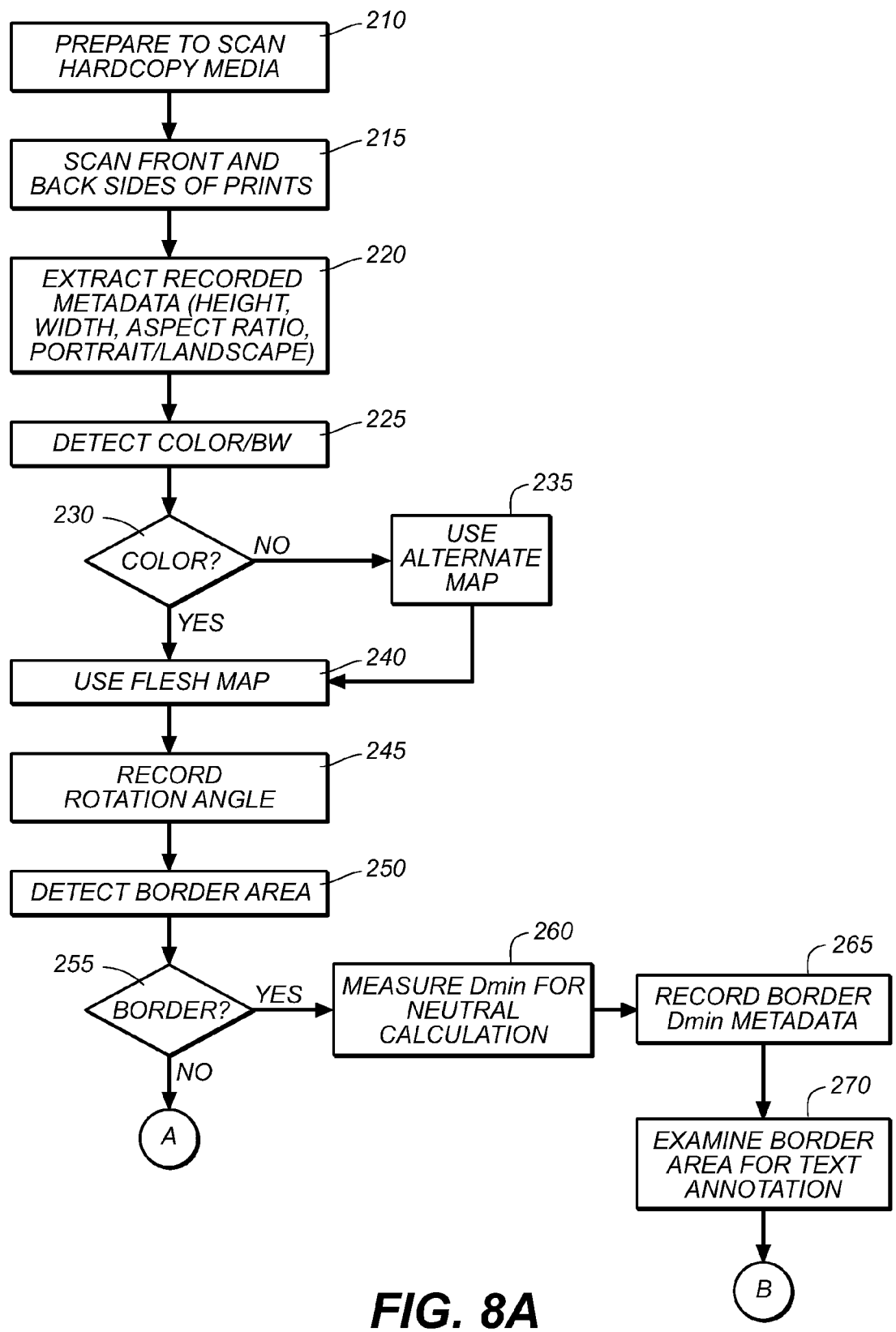
FIGS. 8A and 8B are flow charts illustrating the sequence of operation for creating the recorded, derived, and complete metadata representations.
Figure 8B:
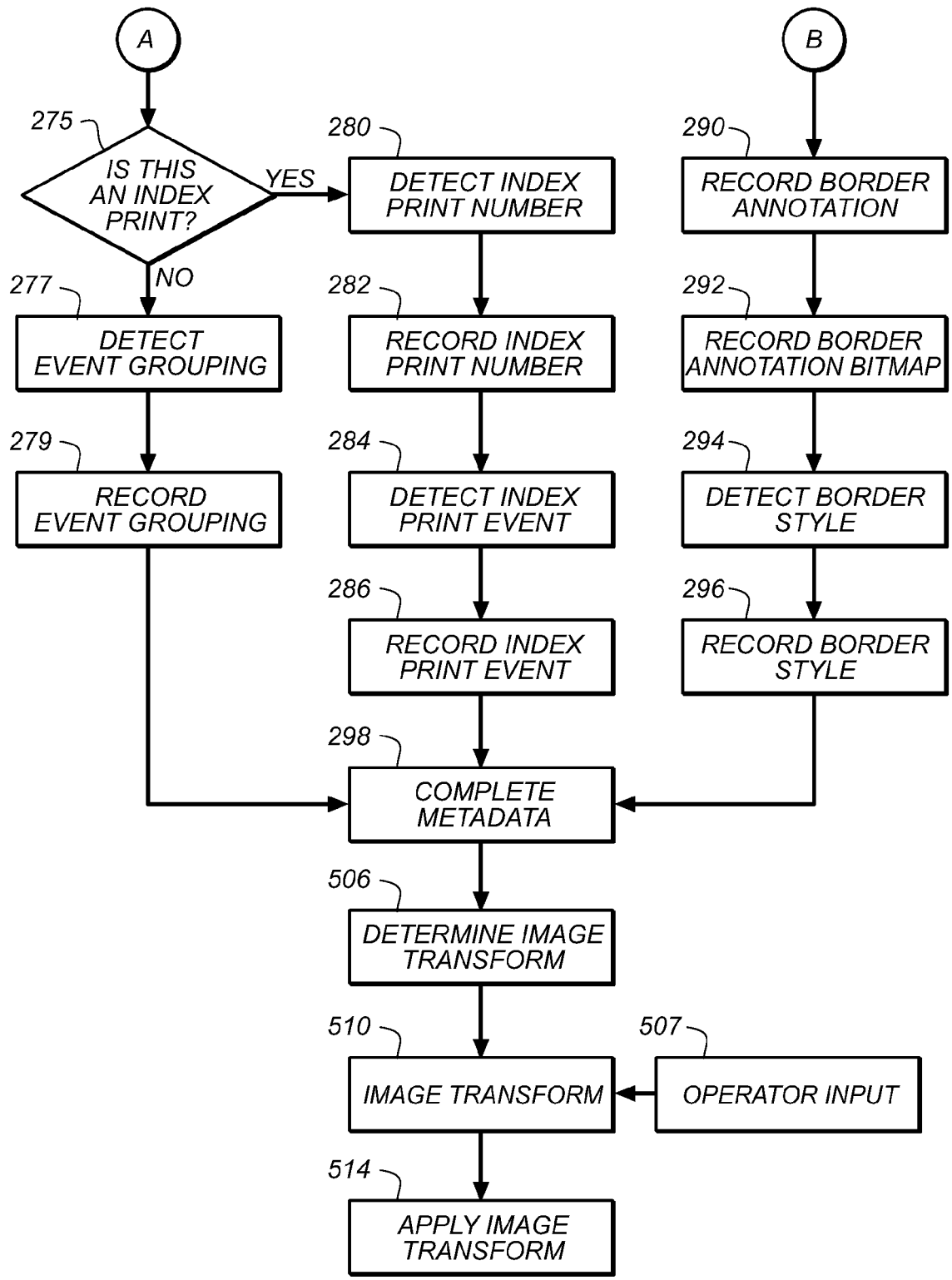

FIGS. 8A and 8B are flow charts illustrating the sequence of operation for creating the recorded, derived, and complete metadata representations. Hardcopy medium can include one or more of the following forms of input modalities: prints in photofinishing envelopes, prints in shoeboxes, prints in albums, and prints in frames. However, the embodiment is not limited to the above modalities, and other suitable modalities can be used.

Referring now to FIGS. 8A and 8B, a description of the operation of a system according to the present invention will now be described. FIGS. 8A and 8B are graphic depictions of a flowchart illustrating the sequence of operations for hardcopy image scanning and complete metadata creation. The hardcopy medium can include any or all of the following forms of input modalities, such as prints in photofinishing envelopes, prints in shoeboxes, prints in albums, and prints in frames.

The hardcopy medium can be scanned by a scanner in any order in which the medium was received. The medium is prepared 210 and the front and back of the medium is scanned 215. The scanner creates information in the image file that can be used to extract the recorded metadata information 220. By using a Color/Black and White algorithm 225, a decision point is created 230 and the appropriate color map (non-flesh, i.e. black and white) 235, (flesh color) 240 is used to find, but is not limited to, faces in the image. If the map is rotated in orientations of 0, 90, 180, 270 degrees with a face detector, the orientation of the image can be determined and the rotation angle (orientation) is recorded 245. The orientation will be used to automatically rotate the image before it is written (useful before writing to a CD/DVD or displaying one or more images on a display).

Using a border detector 250, a decision point is made if a border 255 is detected. If a border is detected, a minimum density (Dmin) 260 can be calculated by looking in the edge of the image near the border. After the border minimum density is calculated, it is recorded 265 in the derived metadata. Text information/annotation written in the border can be extracted 270. OCR can be used to convert the extracted text information to ASCII codes to facilitate searching. The border annotation is recorded 290 into the derived metadata. The border annotation bitmap can also be recorded 292 into the derived metadata. The border style such as scalloped, straight, rounded is detected 294 and recorded 296 into the derived metadata. If the image is an index print 275, information such as the index print number can be detected 280 and recorded 282. Index print events can also be detected 284 and recorded 286. If the image is not an index print 275, information such as a common event grouping can be detected 277 and recorded 279. The common event grouping is one or more images originating from the same event or a group of images having similar content. For example, a common event grouping can be one or more images originating from a fishing trip, birthday party or vacation for a single year or multiple years. The complete set of metadata 298 (i.e., digital dynamic metadata record) is created by combining the recorded and derived metadata.

In a determine image transform step 506, the derived metadata 298 is used to generate an image transform 510 and the image transform 510 is applied in the apply image transform block 514. The image transform 510 is an operation (executed by software or hardware) that either re-arranges or modifies the pixel values of an image. In the present embodiment, the determine image transform step 506 uses derived metadata information 298 originally derived by scanning the non-image surface 100 of print medium 90 to determine the image transform 510. For example, the image transform 510 can be an image rotation such that the image orientation is corrected in accordance with a determined image orientation 216 in FIG. 9, producing a rotated scanned digital image.

The determine image transform step 506 can also use derived metadata 298 associated with other images from the same event grouping to determine the image transform 510. This is because an event grouping is detected 277 using watermarks 102 and recorded 279, as described above. In addition, the determine image transform 506 step can also use image information (i.e. pixel values) from the image and other image(s) from the same event grouping to determine the image transform 510. After application of the image transform, the improved rotated scanned digital image can be printed on any printer, or displayed on an output device, or transmitted to a remote location or over a computer network. Transmission can include placing the transformed image on a server accessible via the internet, or emailing the transformed image. Also, a human operator can supply operator input 507 to verify that the application of the image transform 510 provides a benefit. For example, the human operator views a preview of the image transform 510 applied to the image, and can decide to 'cancel' or 'continue' with the application of the image transform. Further, the human operator can override the image transform 510 by suggesting a new image transform (e.g. in the case of image orientation, the human operator indicates via operator input 507 a rotation of counterclockwise, clockwise, or 180 degrees).

For example, the image transform 510 can be used to correct the orientation of an image based on the derived metadata associated with that image and the derived metadata associated with other imaged from the same event grouping. The image's orientation indicates which one of the image's four rectangular sides is "up", from the photographer's point of view. An image having proper orientation is one that is displayed with the correct rectangular side "up".

Figure 9:
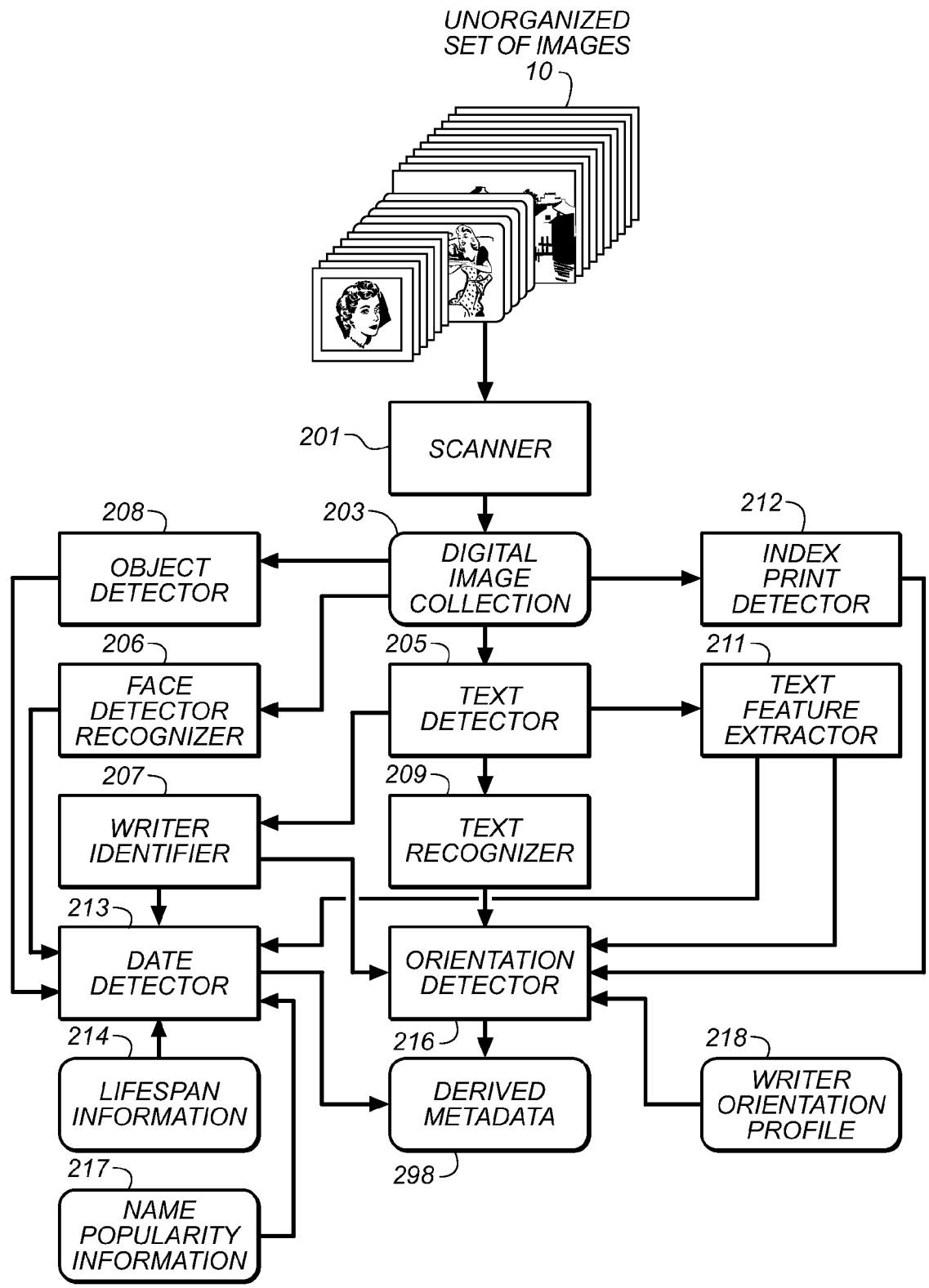
FIG. 9 shows a flow chart that illustrates the automatic creation of metadata associated with the image capture dates and orientations of digital images from a scanned image collection.

In FIG. 9, an inventive method for determining the orientation of a scanned photographic print is illustrated. A collection of hardcopy medium 10 is scanned by a scanner 201. Preferably, the scanner 201 scans both the image side (producing a scanned digital image) and the non-image side of each photographic print. The collection of these scans make up a digital image collection 203.

A text detector 205 is used to detect text on either the scanned digital image or the scan of the non-image side of each image. For example, text can be found with the method described by U.S. Pat. No. 7,177,472. In the present invention, there are two types of text that are of primary interest: handwritten annotations and machine annotations.

Handwritten annotations contain rich information, often describing the location of the photo, the people (and sometimes their ages) in the photo and the date of the photo. In addition, many people write the annotation in a specific location on the print, and it becomes an excellent indicator of the orientation of the image.

The text feature extractor 211 extracts features related to the position of the text, whether the text was on the image or the non-image side of the photographic print, and the orientation of the text. Orientation of text is readily found by such methods as U.S. Pat. No. 6,993,205.

It has been found that most handwritten annotations are placed on the photographic print in a manner such that the annotation has the same orientation as the print. (In a test sample, this was true for approximately 80-90% of annotated photographic prints.) For example, in FIG. 10A, a photographic print 620 is displayed in the correct orientation. FIG. 10B shows that the non-image side 622 of the print 620, shown by flipping the print 620 about its vertical axis, contains an annotation 626 "Hannah 5 Jonah 3" apparently indicating the names and ages of the subjects of the print. When the annotation is analyzed by the text feature extractor 211 of FIG. 9 features are extracted. The features are related to the location of the annotation, the size (e.g. the height of a particular lower-case letter) and length of the annotation, the recognized characters in the annotation, the orientation of the annotation, and features useful for recognizing the writer of the annotation. In particular, for the example shown in FIGS. 10A and 10B, the orientation detector 216 determines the scanned digital image corresponding to the photographic print 620 is in the correct orientation because the handwritten text orientation (a feature derived by the text feature extractor 211) is usually correlated with the image orientation, even though the annotation is on the non-image side of the hardcopy medium.

As another example, in FIG. 1C shows a handwritten annotation 628 on the image side of the photographic print 624. Again, the text feature extractor 211, and the orientation detector 216 of FIG. 9 determine that the scanned digital image corresponding to the photographic print 624 is in the correct orientation.

Figure 10D:
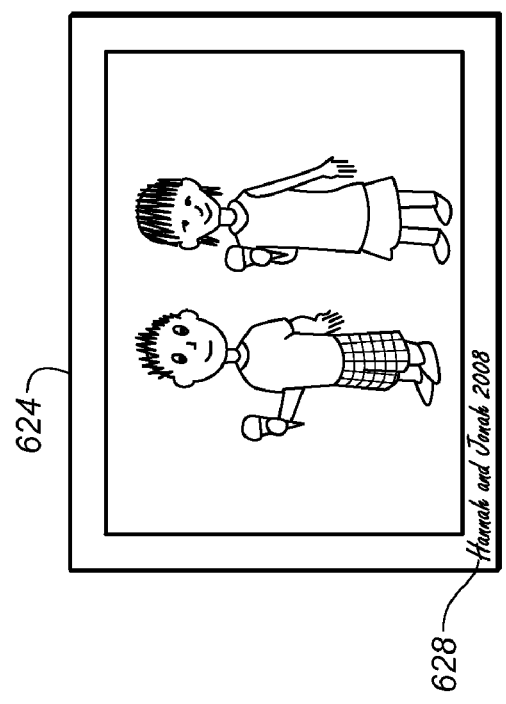
FIG. 10D is an illustrative image side of a hardcopy medium containing a handwritten annotation indicating the identities of persons in the image and the image capture date where the image and the text annotation have different orientations.
Figure 11A:
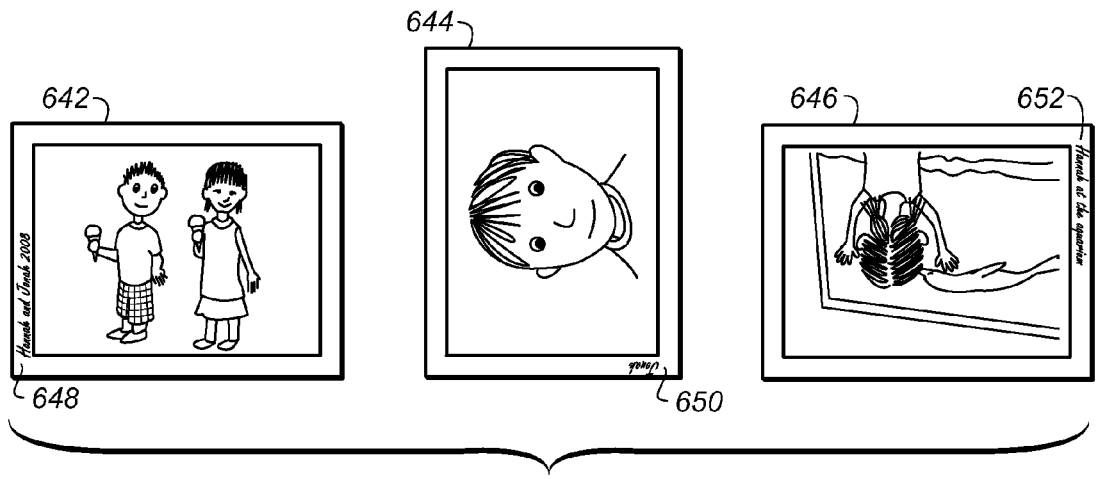
FIG. 11A is an illustrative set of images having text annotation scanned in random orientation.

Not all annotations share a common orientation with the image. For example, see FIG. 10D, where the annotation 632 has a different orientation than the photographic print 630. On the surface, it would appear that misclassification of the orientation of this image could occur if only the orientation of annotations is considered (because, as mentioned hereinabove, most photographic prints share a common orientation with a handwritten annotation.) However, the present invention has the ability to learn for each writer of an annotation, the relationship between the annotation's orientation and the orientation of the photographic print. Most writers (photo-labelers) add annotation in a consistent fashion, for example, always annotating the left front side of the photographic print. Referring again to FIG. 9, the writer identifier 207 determines the identity of the writer of the annotation discovered by the text detector 205. Techniques for automatically identifying the author of a handwritten sample, or determining that two handwriting samples have the same author are discussed by C. Tomai, B. Zhang and S. N. Srihari, "Discriminatory power of handwritten words for writer recognition," *Proc. International Conference on Pattern Recognition (ICPR* 2004), Cambridge, England, August 2004, IEEE Computer Society Press, vol. 2, pp. 638-641. When a large number of hardcopy medium 10 are scanned, there are many times a group of annotated images that are annotated by the same author, as for example are shown in FIG. 11A. Three images 642, 644, 646 are illustrated. The writer identifier 207 determines these three images have annotations 648, 650, 652 from the same writer.

Figure 11B:
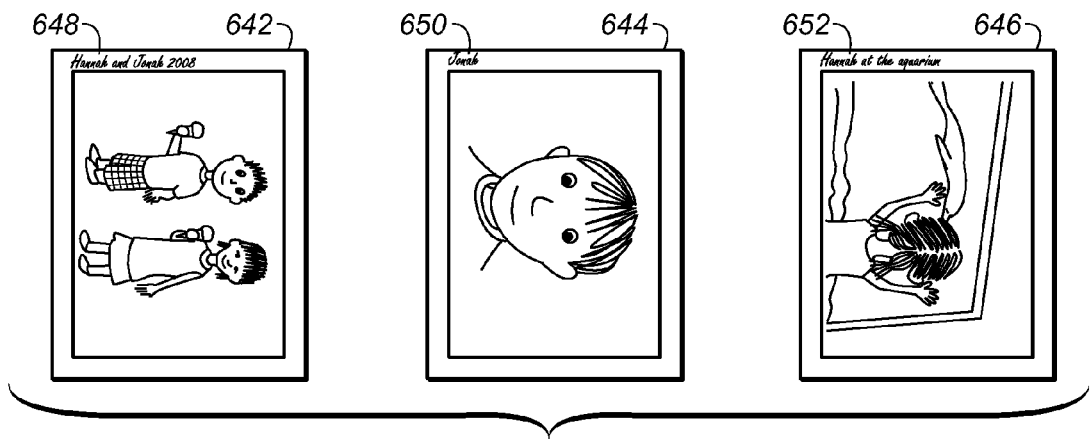
FIG. 11B show images aligned based on text annotation orientation.

In one embodiment of the present invention, all images having annotations from the same writer are oriented as a group. First, the images are rotated to align the orientation of the images, as illustrated in FIG. 11B. At this point, images 642, 644, 646, all have a common relative orientation because the writer annotated the photographic prints in a consistent fashion (i.e. on the left edge of the print border.) Note that this figure is merely for illustration, and software can keep track of the annotation orientation without explicitly rotating the images, for example, in cases where efficiency is desired.

Figure 11C:
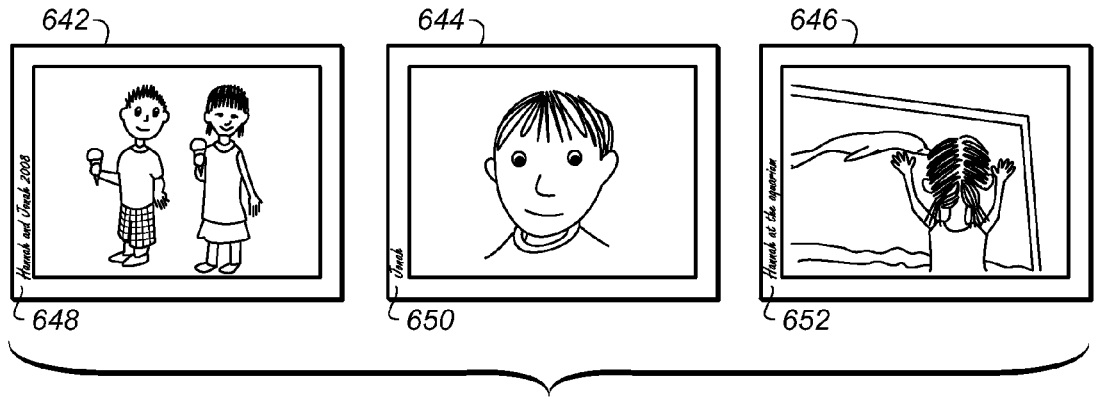
FIG. 11C show images resulting from the application of an image transform to position the images in proper orientation.

Analysis of the image pixel data and the derived metadata in the orientation detector 216 of FIG. 9 determines the orientation of the images of the images determined to be annotated by the same writer and the image transform to properly orient each image. In operation, an algorithm first determines the default orientation of all the images in the group of images annotated by the same writer. An algorithm such as the algorithm disclosed in U.S. Pat. No. 5,642,443 to Goodwin et. al. and incorporated by reference herein, is useful for this step. Other features, such as faces (see U.S. Pat. No. 6,940,545), or vanishing points as disclosed in U.S. Pat. No. 6,591,005 are also be used to determine the default orientation. Multiple types of features related to oriented objects can easily be combined probabilistically with well-established methods such as Bayesian Networks, e.g. as discussed in U.S. Pat. No. 7,215,828. FIG. 11C shows all the images 642, 644, 646 annotated by a single writer after using a face detector for establishing the orientation. The face detector finds the faces in images 642 and 644. Thus, with high likelihood it is known that the annotations are on the left front border of the image. For image 646, features derived from the image itself do not confidently determine the orientation of the image, so the position and orientation of the annotation 652 is used to determine the most likely orientation of the photographic print, knowing that the orientation of the image 646 relative to its annotation 652 is likely to be similar to that of other prints annotated by the same writer.

The relationship between a writer's annotations and the orientation of the photographic print is learned and stored as a writer orientation profile 218 in FIG. 9. Once this profile is known, when additional photographic prints are scanned, and the writer identifier 207 determines that the print contains an annotation from a specific writer, the corresponding writer orientation profile 218 is used by the orientation detector 216 to determine the likely orientation of the photographic print. For example, for the writer Paul, the writer orientation profile 218 contains:

| Relationship | Occurrences |
|---|---|
| Annotation on left front border | 27 |
| Annotation on top front border | 6 |

Then, when another print is discovered that contains an annotation by Paul, we would expect (without considering evidence from the image itself) that the orientation of the print is such that the annotation is on the front left side of the print. Such a table is maintained for each unique writer of annotations.

To summarize, the writer identifier 207 is used to identify the writer of an annotation on a photographic print. This information is used, along with features extracted describing the annotation by the text feature extractor 211 to determine the likely orientation of the photographic print.

Referring again to FIG. 9, the text detector 205 also detects machine printed text. It is common for photographic prints to contain machine printed text, for example:
 (a) Image date imprint. This can be either on the image or the non-image side of the print. It can be on the border or within the image itself.
 (b) Watermarks.
 (c) Photofinishing marks left by the processing lab.

A date detector 213 analyzes the recognized text from a text recognizer 209. Text recognizer 209 is well known by the name of OCR, Optical Character Recognition.

The recognized text is analyzed by the date detector 213 that searches the text for possible dates, or for features that relate to a date. The date detector 213 uses multiple features to determine the image capture date of the photographic print. Note that the image capture date can be precise (e.g. Jun. 26, 2002 at 19:15) or imprecise (e.g. December 2005 or 1975 or the 1960s), or can by represented as a continuous or discrete probability distribution function over time intervals. Features from the image itself give clues related to the date of the image. Additionally, features describing the actual photographic print (e.g. black and white and scalloped edges) are used to determine the date. Finally, annotations can be used to determine the date of the photographic print as well. When multiple features are found, a Bayesian network or another probabilistic model is used to arbitrate and determine the most likely date of the photographic print.

A printed date and the orientation of a photographic print are often related. Many film cameras print the date on the film in the lower-right-hand corner of the image. Thus, when a printed date is found within the image boundary, its position provides information about the orientation of the print.

In a similar fashion to way that handwritten annotations are used to group photographic prints into groups that have been annotated by a single writer, the printed dates can be used to group prints into events. Furthermore, the position and orientation of the date are also related to the orientation of the print via the camera make and model. For example, for photographic prints made from 126 format film, the date of the printing is often stamped onto the border of the front of the photographic print. All prints that have the same date annotation are a group. It is highly likely that all photographic prints in such a group will have the same orientation relative to the orientation of the date annotation (especially since the aspect ratio of prints from a 126 format camera is square, so there is little incentive for the photographer to rotate the camera when taking a photograph).

Figure 12A:
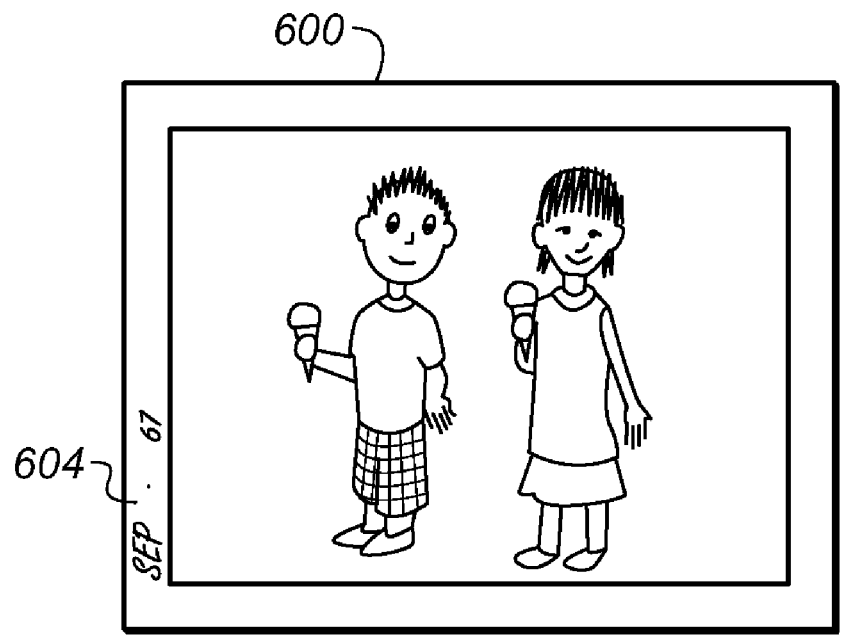
FIG. 12A shows an illustrative image containing a printed date in the margin.
Figure 12B:
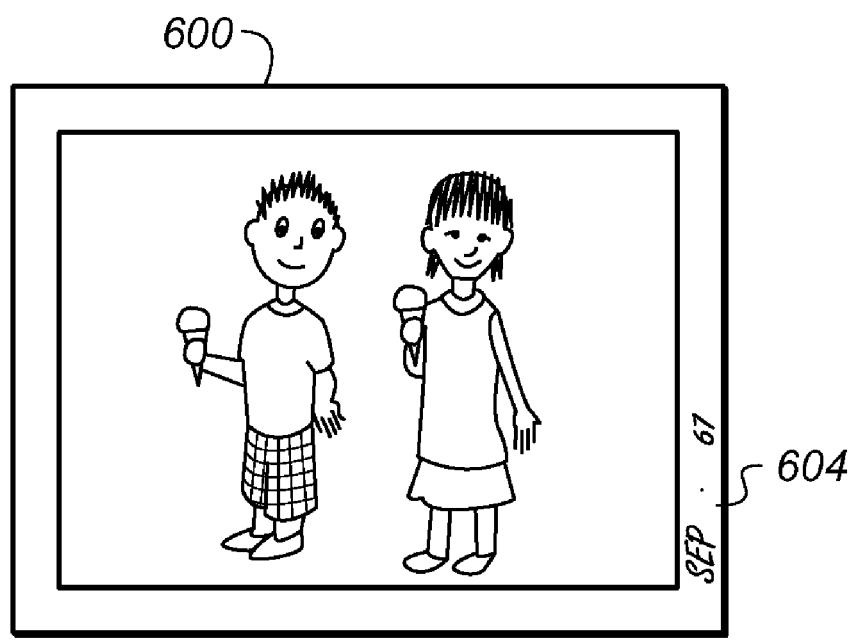
FIG. 12B shows an illustrative image containing a printed date in the margin.

Even without grouping the image, the location and orientation of a printed date in an image boundary provides information about the print orientation. The orientation of the date is either 'in' or 'out', where 'in' means that the base of the characters that make up the date annotation is closer to the print center than to the print edge. FIG. 12A shows an example of a print 600 having a date annotation 602 that is 'in' and FIG. 12B shows a print with a date annotation 604 that is 'out'. In a sampling of 20 photographic prints from a 126 format camera having the date printed on a front border, the following was observed:

| | Count(Orientation = o|Date annotation orientation) | | | |
|---|---|---|---|---|
| | North | South | East | West |
| Date annotation 'in' | 4 | 0 | 0 | 0 |
| Date annotation 'out' | 0 | 0 | 11 | 7 |

The directions "North", or "South", for example, describe the position (up or down) of the date annotation when the image is displayed in the correct orientation. This shows that the orientation of the date provides information about the orientation of the print. Such a table is maintained for many different film formats an camera types, and the entries in the table are augmented as new prints are scanned (and the orientation of the new images is provided by a human operator or surmised with a high level of confidence). Note that information about the camera type or film format can aid in the detection of the date and vice-versa. This is due to the fact that the position of the date and the camera type are related. One recommended approach includes jointly determining camera type or film format as well as date simultaneously.

In summary, the position and orientation of a date are related to the orientation of the print. By knowing the position and orientation of the date (if it exists) and the camera make and model, the accuracy of detecting the orientation of the print (and corresponding digital image) are improved.

Figure 13:
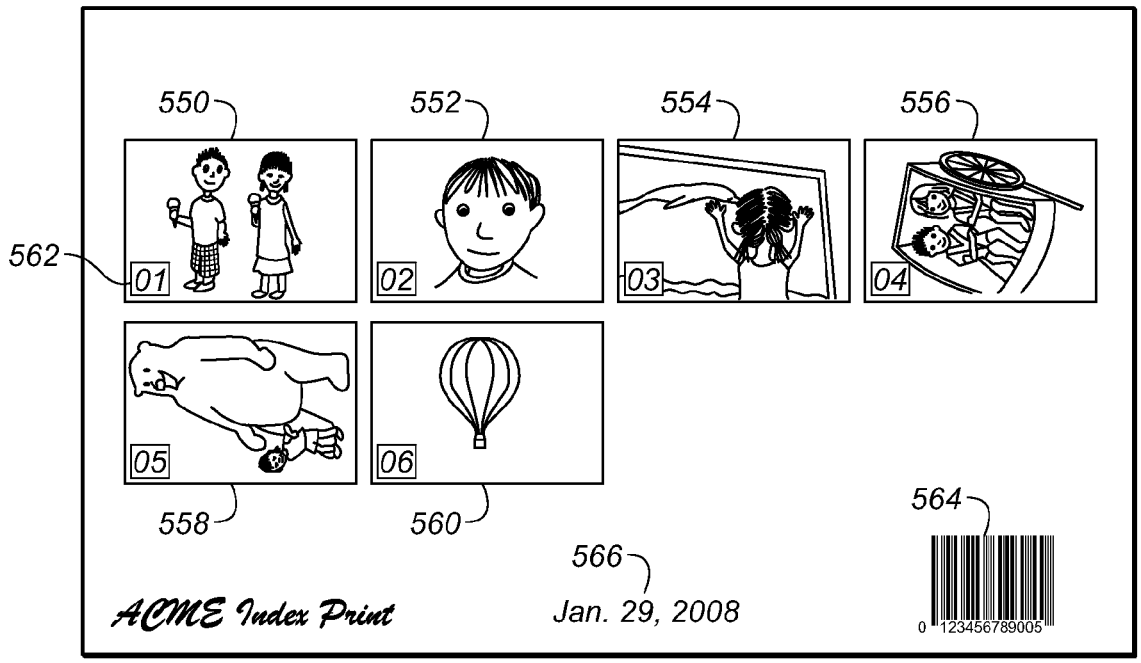
FIG. 13 shows an illustrative index print.

When a large pile of photographic prints are scanned, sometimes in this pile are index prints. An index print contains imagettes (thumbnail images) of all images recorded on a roll of film. An example index print containing imagettes 550, 552, 554, 556, 558, and 560 is shown in FIG. 13. Often, the imagettes are labeled with an index or frame number 562 for easy reordering. The index print often contains an order identification number 564 and a date 566. The index print detector 212 detects whether a scanned photographic print is an index print (see discussion of FIG. 8B and FIG. 9). When an index print is detected, the imagettes are segmented stored, and associated with the order date 566. Index prints often contain the order date 566 printed in text that can be reliably interpreted automatically by optical character recognition (OCR) techniques.

For some index prints, each and every imagette is displayed in the proper orientation. When the index print was made from a film strip, the orientation of the landscape format images is generally correct. When the photographer rotated the camera to portrait format, portrait images such as 556 and 558 are the result. In any case, by matching a photographic print with its corresponding imagette on an index print, a great deal of information about the orientation of the photographic print is learned. According to Luo in U.S. Pat. No. 7,215,828, the prior probability for the orientation of such an image (for 35 mm film) is around 70% (correct orientation), 14% (requires a 90 degree counter-clockwise rotation), 14% (requires a 90 degree clockwise rotation), and 2% (requires a 180 degree rotation).

When a photographic print (e.g. the image 642 from FIG. 11C) is scanned to produce a scanned digital image, it is compared with the stored imagettes with standard methods for matching images (using for example U.S. Pat. No. 6,961,463) including the steps of extracting features from the scanned digital image and extracting thumbnail features from the imagettes (thumbnails) from the index prints. For example, the features can be histograms of color values contained in the images. Then, the similarity between the scanned digital image and any thumbnail image is assessed by comparing the features and the thumbnail features (e.g. by computing the distances between the histograms with L1 distance, L2 distance, or $\chi^2$ distance). A scanned digital image and a thumbnail image are considered to match if their similarity exceeds a threshold (e.g. this is similar to determining if the distance between their feature histograms is smaller than a threshold). To find a match, the digital image can be considered in each of the four (or two (for rectangular images)) possible orientations when comparing with the imagettes.

When a digital image from a photographic print is found to match an imagette, information about the digital image orientation is learned (i.e. it matches the prior probability for the possible orientations of the corresponding matching imagette). Note that these prior probabilities vary depending on the film or camera format. For example, index prints are often made for print orders of digital images from digital cameras having orientation sensors. In this case, the orientation of the imagette is known with certainty.

Using this same idea, the image capture date of a photographic print is established. The image capture date of the photographic print is determined to be the same as the date from the index print containing the matching imagette.

Figure 14:
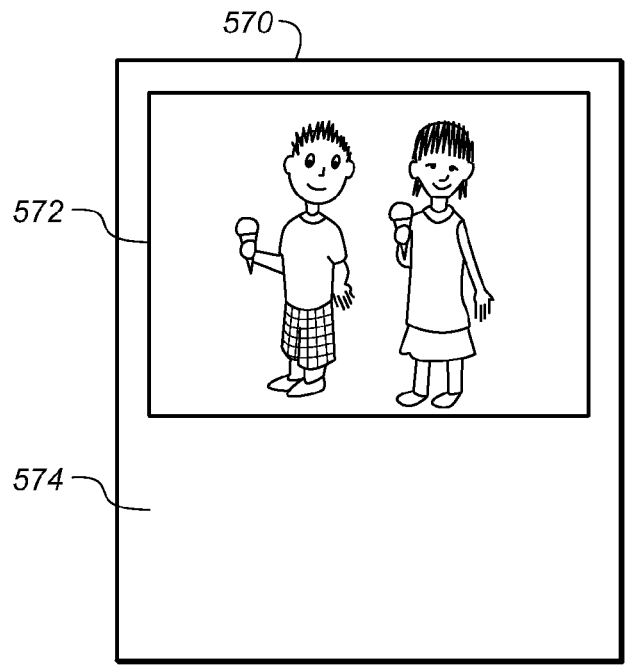
FIG. 14 shows an illustrative print from an instant camera.

Note that in some cases, identifying the film or camera format has nearly an exact correlation with determining the orientation of the image. For example, with an instant photograph as for example is illustrated in FIG. 14, the image area 572 in a photographic print 570 is nearly square, so the camera was rarely rotated when capturing an image. Therefore, by identifying that the photographic print 570 originates from an instant print camera format, the wide portion of a border 574 is almost always at the bottom of the print, and the orientation is thus known.

In a similar manner, for Disc film the orientation of the film negative relative to the camera is known (the edge of the negative toward the center of the camera is the bottom of the image). The orientation of the watermark on the non-image side of the photographic print 570 usually corresponds to the correct orientation of the photographic print 570.

In a further embodiment, it is known that when people guess the date of a photographic print, they use the presence of objects within the image. For example, an image collection owner might say "This me in our backyard on 3rd Street. We moved there in 1949, so this photo is probably from 1949". Many objects can provide concrete cues about the date of the image. For example, specific cars (either by the date the car was acquired, or more generally, the manufacturer date) can be a strong indicate of the image date. If an image contains a 2007 Honda Odyssey, then the image could not have been captured prior to 2006 (a specific model year vehicle is often available in the prior calendar year). However, if it is known that the owner of the Honda purchased the vehicle in 2008, then the image containing the vehicle must be from at the earliest 2008. The same holds true for other artifacts that contain clues relevant to dating the photo such as: clothing style, furniture, tools and gadgets.

The people present in the image are important clues to establish the date of an image. For example, knowing the birth and death dates of Abraham Lincoln are 1809 and 1865, respectively, permit one to know that any photo of Lincoln must be dated between 1809 and 1865. (This range can of course be narrowed given that the first known photograph of Lincoln was not captured until the 1840s). In a similar manner, if the identities of one or more persons in an image are known along with their lifespans, then an approximate image capture date can be established.

Furthermore, when the identity of a person in an image is known along with their age and birth date, then the image capture date is given as:

$$D=B+A \qquad (1)$$

Where D is the image capture date, B is the birth date of the person with known identity, and A is the age of the person with known identity. The birthdates and ages can be known with uncertainty, for example the expression:

$$P(d=y) = \sum_{n=Y_1}^{Y_2} P(b=n)P(a=y-n) \qquad (2)$$

where:
d is the image capture date;
y is a particular year (i.e. a possible image capture date)
b is the birth date of the identified person
n is a particular year (i.e. a possible birth year)
a is the age of the identified person
$Y_1$ and $Y_2$ represent the range of possible birth years.
This expression permits the computation of the likelihood that the image was captured is a particular year P(d=y) assuming there is some distribution over birth date P(b=n) and age P(a=y−n). In this expression, the distributions are represented as discrete probability distributions, but those skilled in the are will understand that the distributions can be represented as continuous variables, possibly using parameterized distributions (e.g. a normal distribution for the possible birth year of a person, perhaps truncated to place zero mass of the possibility of the person being born in the future). Note that if birth year and age are known with certainty, then expression (2) defaults to be (1), where P(d=y) is zero for all values of y except at y=B+A, where P(d=y)=1.

In FIG. 9, a method for establishing the date of an image is described. An object detector 208 is used to identify any dating objects. A dating object is an object that can be used to identify the date (or narrow down the possible date range) of the image. For example, the object detector 208 identifies the make and model year of vehicles as well as consumer products (e.g. an iPod in an image provides the information the image capture date is 2001 or later) that are used to determine a plausible date range for the image by the date detector 213. People and vehicles are also dating objects.

Regarding the use of people in the image, lifespan information 214 is passed to the date detector 213. Lifespan information 214 includes the birth dates or death dates of people of interest that can appear in the image collection. Typically, lifespan information is provided by the user via a user interface such as a keyboard, touch screen, or pointing device.

The fact that a particular person is in an image can be established in a number of ways. First, using a face detector and recognizer 206, a face is found and the person's identity is established. Face detection and recognition in consumer images is described for example in U.S. Patent Application Publication No. 2007/0098303. The estimated age of the face is estimated using a method such as A. Lanitis, C. Taylor, and T. Cootes, "Toward automatic simulation of aging effects on face images," *PAMI*, 2002 and X. Geng, Z.-H. Zhou, Y. Zhang, G. Li, and H. Dai, "Learning from facial aging patterns for automatic age estimations" in *ACM MULTIMEDIA*, 2006 and A. Gallagher in U.S. Patent Application Publication No. 2006/0045352. For estimating the age of a face, features are extracted and a classifier is used to estimate the likelihood of the face having a particular age.

Then, given the lifespan information 214 associated with the person of interest and the estimated age of the person of interest, the image capture date is computed with (1) or (2).

Figure 10A:
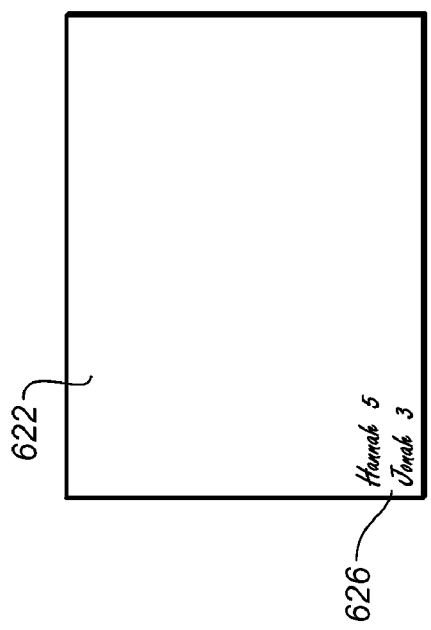
FIG. 10A is an illustrative image side of a hardcopy medium.
Figure 10B:
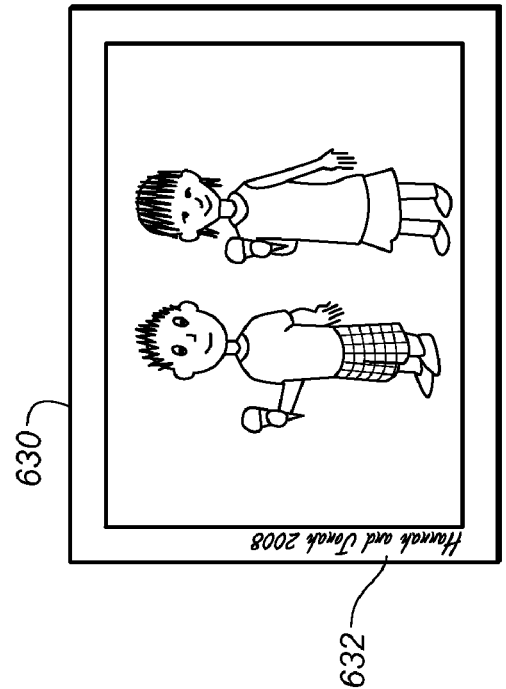
FIG. 10B is an illustrative non-image side of a hardcopy medium containing handwritten text annotation indicating the identities of persons in the image and the associated ages of the persons.
Figure 10C:
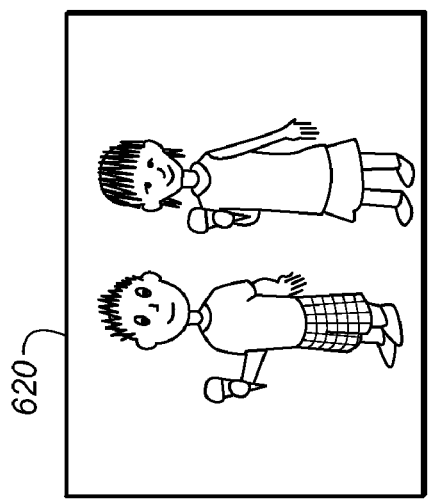
FIG. 10C is an illustrative image side of a hardcopy medium containing a handwritten annotation indicating the identities of persons in the image and the image capture date where the image and the text annotation have similar orientations.

In can also be known that a person of interest is in the image due to an annotation placed on the image, such as illustrated in FIGS. 10A and 10B. In this case, the text annotation is detected by the text detector 205, and the text annotation is converted to text using well-known OCR techniques by the text feature extractor 211. The text can be detected on the image or the non-image side of the hardcopy medium. Then, the date detector 213 parses the text to identify names of persons of interest and ages (usually, numbers in the range (0 to 100) next to a name on an image's text annotation represent the age of that person in the image). Then the date detector 213 can use the lifespan information 214 associated with the person of interest along with the age information (from the text annotation, or, if omitted, estimated from a face from the image using well known techniques described above.) Note that in the case where multiple names annotate the image and multiple faces are in the image, the most likely assignment of names to faces can be found, considering the ages and genders of the ages and faces.

Furthermore, the present invention can often determine the birth date of a particular person of interest from one or a set of scanned hardcopy medium and then this birth date is used subsequently for estimating the image capture date of a subsequently scanned hardcopy medium. For example, in FIG. 10D, the text annotation is "Hannah and Jonah 2008". The year, "2008" is recognized by the date detector 213 as the year associated with the image capture date. Then, the birth dates (i.e. the lifespan information 214) is estimated by detecting faces in the digital image and assigning the names (e.g. "Hannah" and "Jonah") with faces as previously described with the face detector/recognizer 206. Then, the ages of each person are estimated as previously described. Because the ages of the people and image capture dates are known, the birth dates can be found according to Eqs. (1) or (2). In a subsequent image scan, (e.g. the photographic print in FIGS. 10A and 10B) the birth date ascertained for the persons of interest can be used to determine the image capture date of the image. Note that the scanning order is actually not relevant. The image capture dates of previously scanned images can be refined (updated) as more information (lifespan information 214) regarding the persons in the image collection are learned.

Note that equations (1) and (2) above relate to only a single person of interest in an image. Eq. (2) can be extended to consider multiple people in an image simply by including additional multiplicative terms:

$$P(d = y) = \prod_{i=1}^{m} \sum_{n=Y_1}^{Y_2} P(b_i = n) P(a_i = y - n) \quad (3)$$

where the variables have the same meaning as in (2), including:
m is the number of people in the image,
$b_i$ is the birth date of the $i^{th}$ person, and
$a_i$ is the age of the $i^{th}$ person.
It is expected that the confidence of the image capture date increases with the number of persons in the image (as each person reduces the uncertainty). Therefore, the present invention is used to determine an image capture date for images containing multiple people.

Also, a human operator can tag the faces or the images with the names of the persons in the image using a user interface on a computer. In this case, the names can be assigned to faces, the ages of the faces estimated, and the image capture date estimated by the date detector 213 according to (1) or (2).

Figure 10E:
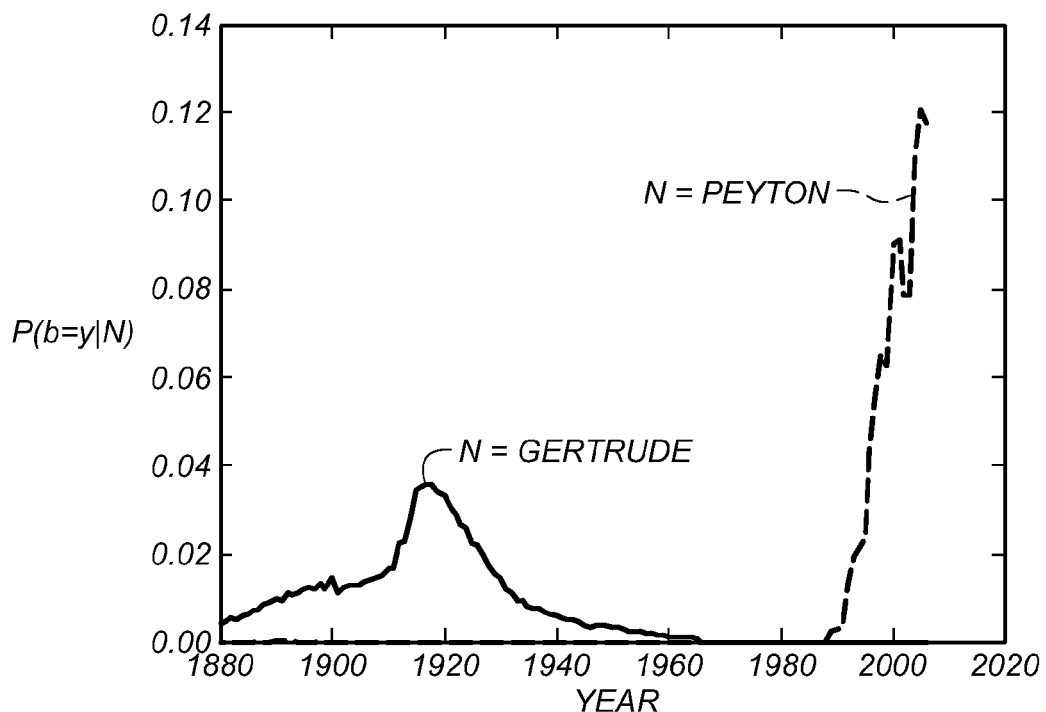
FIG. 10E shows the probability of birth year for the first names of Gertrude and Peyton.

Furthermore, the present invention can be used to determine the image capture date of an image even when the annotation contains names but does not disclose the ages, birthdates or lifespan information 214. In this case, the text annotation is detected by the text detector 205, and the text annotation is converted to text using well-known OCR techniques by the text feature extractor 211. The text can be detected on the image or the non-image side of the hardcopy medium. Then, the date detector 213 parses the text to identify names of persons of interest in the image. Because the popularity of first names varies over time, the date of a hardcopy media can be roughly established just by considering the names of persons present in the image. For example, given an image containing Peyton, Abby and Emily, it would be safe to assume the image was captured in the 2000s. Given an image containing Mildred and Gertrude, we would assume the image is much older (say the 1920s). These intuitions are reduced to equations as follows:

For each name in the image, find the probability that a person was born at a particular time (i.e. year) given the name N, P(b=y|N). This represents the popularity of the name over time. For example, FIG. 10E shows P(b=y|N) for the names Gertrude and Peyton, based on data from the United States Social Security Baby Name Database (http://www.socialsecurity.gov/OACT/babynames/). The most likely birth year for Gertrude is 1917 and for Peyton in 2005. The date of the image can be estimated as the date that maximizes the likelihood that people with the set of names would exist at a given time to be photographed together. In a simplistic model, the probability that an image is captured for a given set of m names N is:

$$P(d = y \mid N) \approx \prod_{i=1}^{m} P(b_i = y \mid N_i) \quad (4)$$

Figure 10F:
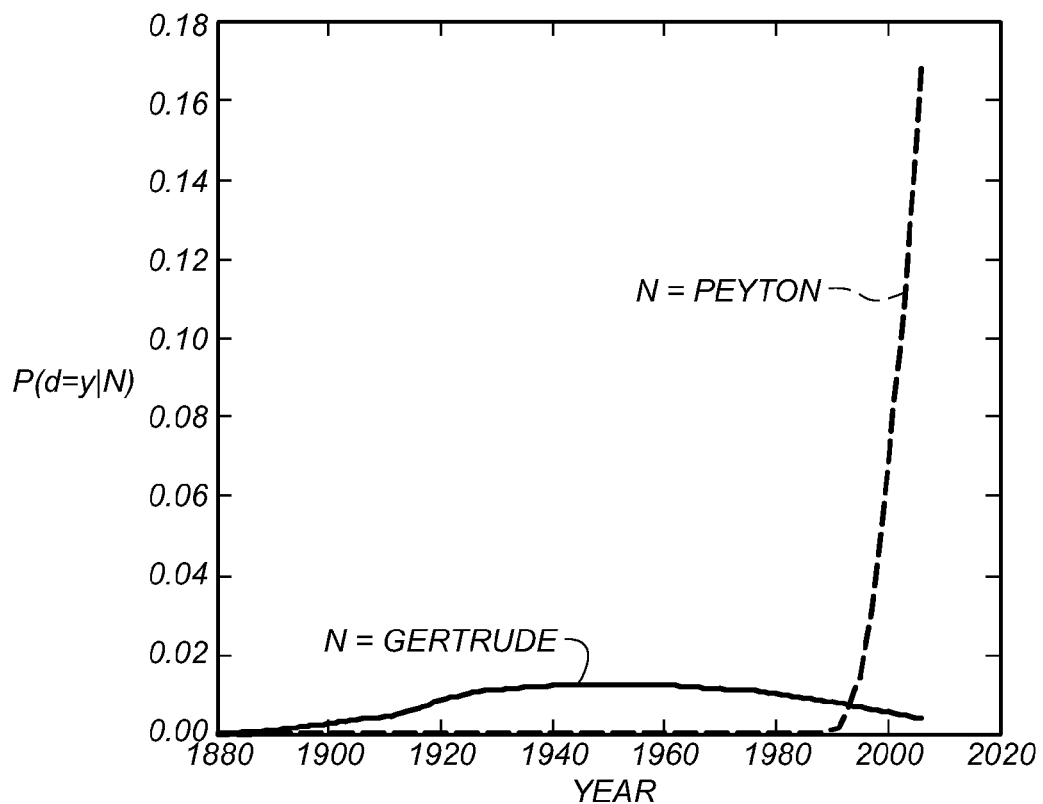
FIG. 10F shows the relative number of people with the first names of Gertrude and Peyton for each year from 1880 to 2006.

This model is improved by considering the life expectancy of persons and the estimated age of faces in the image. Life expectancy tables are useful for computing, at any time, the expected number of persons with a given name. Assuming that the image capture date of a hardcopy medium has a uniform prior, the most likely image capture date of a person having a certain name corresponds to the time when the most people have the certain name. For example, FIG. 10F shows P(d=y|N, L) for Mildred and Peyton. In the year 1951, the most Gertrudes were alive, and the year 2006 (the most recent year from which data are currently available) the most Peytons were alive. An image containing both a Gertrude and a Peyton would most likely have been captured in 2006. Therefore, to consider life expectancy, $$P(d = y \mid N) \approx \prod_{i=1}^{m} P(b_i = y \mid N_i) *_a p_0$$

where:
$_a p_0$ represents the probability of a person surviving until age a. The operator * is convolution.

Although the previous discussion focused on hardcopy medium images containing people with first names within the United States, a similar technique applies to surnames or nicknames and within other cultures.

The invention has been described in detail with particular reference to certain preferred embodiments thereof, but it will be understood that variations and modifications can be effected within the spirit and scope of the invention.

PARTS LIST 10 hardcopy medium
20 1$^{st}$ subgroup images of bordered 3.5"×3.5" prints
30 2$^{nd}$ subgroup images of borderless 3.5"×5" prints with round corners
40 3$^{rd}$ subgroup images of bordered 3.5"×5" prints
50 4$^{th}$ subgroup images of borderless 4"×6" prints
60 Picture book
70 Picture CD
80 Magnetic storage of images (online gallery)
90 Photographic print medium
91 Image surface
92 Date designation
94 Border
96 image data
100 non-image surface
102 Watermark
110 Recorded metadata
111 recorded metadata fields
120 sample values
130 hardcopy medium
140 Recorded metadata
150 Derived metadata
151 metadata fields
160 Derived metadata
161 sample values
170 Derived metadata from scanned image with sample data
180 Recorded metadata
190 Derived metadata
200 digital metadata record
201 scanner
203 digital image collection
205 text detector
206 face detector and reorganizer
207 writer identifier
208 object detector
209 text recognizer
210 Prepared medium
211 text feature extractor
212 index print detector
213 date detector
214 lifespan information
215 Scanned medium/prints
216 orientation detector
217 name popularity information
218 writer orientation profile
220 Extracted recorded metadata
225 color or black and white algorithm
230 Decision point
235 black and white color map
240 flesh color map
245 recorded rotation angle
250 border detector
255 border
260 Measure the Dmin (minimum density) for the neutral color calculation
265 recorded border minimum density
270 Extracted text information/annotation
275 index print
277 Detect like events (pictures taken at the same event)
279 Record the event in the metadata record
280 detected index print
282 Recorded index print
284 Detected index print events
286 Recorded index print events
290 recorded border annotation
292 Record the border annotation bitmap in the metadata record
294 Detected border style
296 Recorded border style
298 complete metadata record
506 determine image transform
507 operator input
510 image transform
514 apply image transform
550 imagette
552 imagette
554 imagette
556 imagette
558 imagette
560 imagette
562 frame number
564 order identification number
566 order date
570 photographic print
572 image area
574 border
600 photographic print
604 date annotation
620 photographic print
622 non-image side
624 image side
626 annotation
628 annotation
630 photographic print
632 annotation
642 image
644 image
646 image
648 annotation
650 annotation
652 annotation

The invention claimed is:
1. A method of determining the image capture date of scanned hardcopy medium, comprising:
 (a) scanning hardcopy medium that includes at least one index print(s) to produce scanned digital images;
 (b) detecting one or more index prints from among the scanned digital images;

(c) identifying thumbnail images contained within the one or more index prints;
(d) determining an image capture date for each index print and associating the image capture date with the thumbnail image(s) contained within that index print;
(e) matching a scanned digital image to a thumbnail image from the one or more index prints, including:
   (i) extracting features from the scanned digital image;
   (ii) extracting thumbnail features from the thumbnail images; and
   (iii) comparing the features and the thumbnail features to find a matching thumbnail image with a scanned digital image;
(f) associating the date from the thumbnail image to the scanned digital image that matches the thumbnail image;
(g) storing the date in association with the scanned digital image that matches the thumbnail image; and
(h) organizing the scanned digital image in accordance with the determined date.

2. The method of claim 1, further including presenting the scanned digital image to a human operator for verification.

3. The method of claim 1, further including printing, emailing, or otherwise transmitting the scanned digital image and the associated date.

4. A method of determining the image capture date and orientation of a scanned hardcopy medium, comprising:
   (a) scanning hardcopy medium that includes at least one index print(s) to produce scanned digital images;
   (b) detecting one or more index prints from among the scanned digital images;
   (c) identifying thumbnail images contained within the one or more index prints;
   (d) determining an orientation for each index print and associating the image capture date with the thumbnail image(s) contained within that index print;
   (e) matching a scanned digital image to a thumbnail image from the one or more index prints;
   (f) associating the orientation from the thumbnail image to the scanned digital image that matches the thumbnail image, including rotating the scanned digital image in accordance with the determined orientation;
   (g) storing the orientation in association with the scanned digital image that matches the thumbnail image; and
   (h) printing the rotated scanned digital image or transmitting the rotated scanned digital image to a display device.

5. The method of claim 4, wherein step (e) further includes:
   extracting features from the scanned digital image;
   extracting thumbnail features from the thumbnail images; and
   (iii) comparing the features and the thumbnail features to find a matching thumbnail image with a scanned digital image.

6. The method of claim 4, further including presenting the rotated scanned digital image to a human operator for verification.

7. The method of claim 4, further including printing, emailing, or otherwise transmitting the rotated scanned digital image.

* * * * *